United States Patent
Geis et al.

(12) 
(10) Patent No.: US 6,321,686 B2
(45) Date of Patent: Nov. 27, 2001

(54) MULTI-PURPOSE, SPECIES-DISCRIMINATING BIRD FEEDER FOR CONTROLLING INGRESS AND EGRESS OF BIRDS INTO INTERIOR OF BIRD FEEDER

(75) Inventors: Aelred D. Geis, Clarksville, MD (US); Dan A. Bloedorn, Chilton, WI (US); Jane Crowley, Bethesda, MD (US)

(73) Assignee: Wild Bird Centers of America, Inc., Glen Echo, MD (US)

( * ) Notice: Subject to any disclaimer, the term of this patent is extended or adjusted under 35 U.S.C. 154(b) by 0 days.

(21) Appl. No.: 09/766,838

(22) Filed: Jan. 23, 2001

Related U.S. Application Data

(63) Continuation of application No. 09/352,322, filed on Jul. 12, 1999, now abandoned.
(60) Provisional application No. 60/122,102, filed on Feb. 26, 1999, and provisional application No. 60/131,928, filed on Apr. 30, 1999.

(51) Int. Cl.[7] .................................................... A01K 39/00
(52) U.S. Cl. .............................................................. 119/429
(58) Field of Search ..................................... 119/428, 429, 119/52.2, 52.3, 52.4, 57.8, 57.9

(56) References Cited

U.S. PATENT DOCUMENTS

| | | |
|---|---|---|
| D. 249,075 | 8/1978 | Platt . |
| D. 381,227 | 7/1997 | Cockrum . |
| D. 381,228 | 7/1997 | Cockrum . |
| 2,184,633 | 12/1939 | Copeman ........................... 119/57.9 |
| 3,295,498 | 1/1967 | Brown ................................ 119/429 |
| 3,372,676 | 3/1968 | Williams . |
| 3,927,645 | 12/1975 | Varner . |
| 3,977,363 | 8/1976 | Fisher, Jr. . |
| 4,167,917 | 9/1979 | Noll .................................... 119/429 |
| 4,570,575 | 2/1986 | Hinz . |
| 5,048,461 | * 9/1991 | Wessner ............................. 119/429 |
| 5,323,735 | 6/1994 | Meng . |

FOREIGN PATENT DOCUMENTS

| | | |
|---|---|---|
| 2192776 | 1/1988 | (GB) . |
| 49854 | 9/1965 | (PL) . |

OTHER PUBLICATIONS

Winterthur Fall 1990 Catalog, p. 26.
Meadowlark Manufacturing, Ltd. Catalog Sheet, "Dedicated to the Needs of Wildlife Habitat".
The Alsto Company Catalog, Jan. 11, 1991, p. 47.
Backwoods Catalog, Bringing Wildlife Home, Jul. 1, 1996.
Wooden Ewe? Inc., Nature Products Catalog, Jul. 1996, pp. 1–20.
Wild Bird Specialty Products Catalog, pp. 1–4.

\* cited by examiner

*Primary Examiner*—Thomas Price
(74) *Attorney, Agent, or Firm*—Miles & Stockbridge P.C.; Edward J. Kondracki

(57) ABSTRACT

A multi-purpose, species-discriminating bird feeder includes a base, a top, and a plurality of sides extending between the base and the top. At least two of the sides include an upper side member and a lower side member. The upper and lower side members are at least partially spaced from each other to provide an ingress/egress opening so that birds of a selected size may enter and exit an interior portion of the bird feeder through its sides. Birds or mammals larger than the selected size are prevented from entering the interior portion. Each upper side member is manually selectively adjustable so that a size of the respective ingress/egress opening between the upper and lower side members may be adjusted. The construction of the bird feeder provides good visibility for the birds to enter the bird feeder and for bird watchers to watch the birds feed. In addition, the location of the ingress/egress openings allows prompt exit from the feeder by birds disturbed by predators or other disturbance. The bird feeder may also include a solid wall against which a feed cup of feeding arrangement is mounted so that the food is protected from inclement weather.

40 Claims, 15 Drawing Sheets

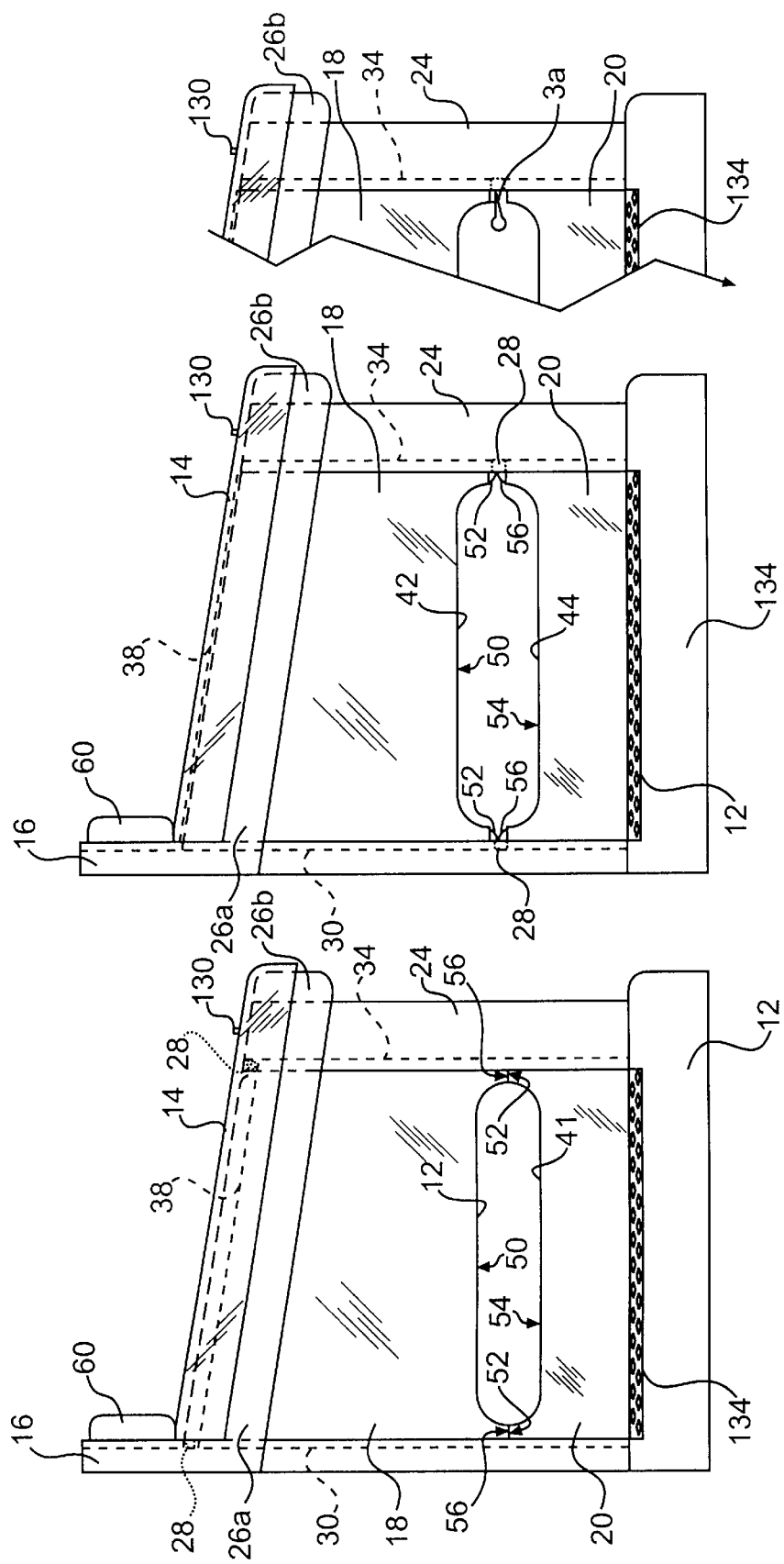

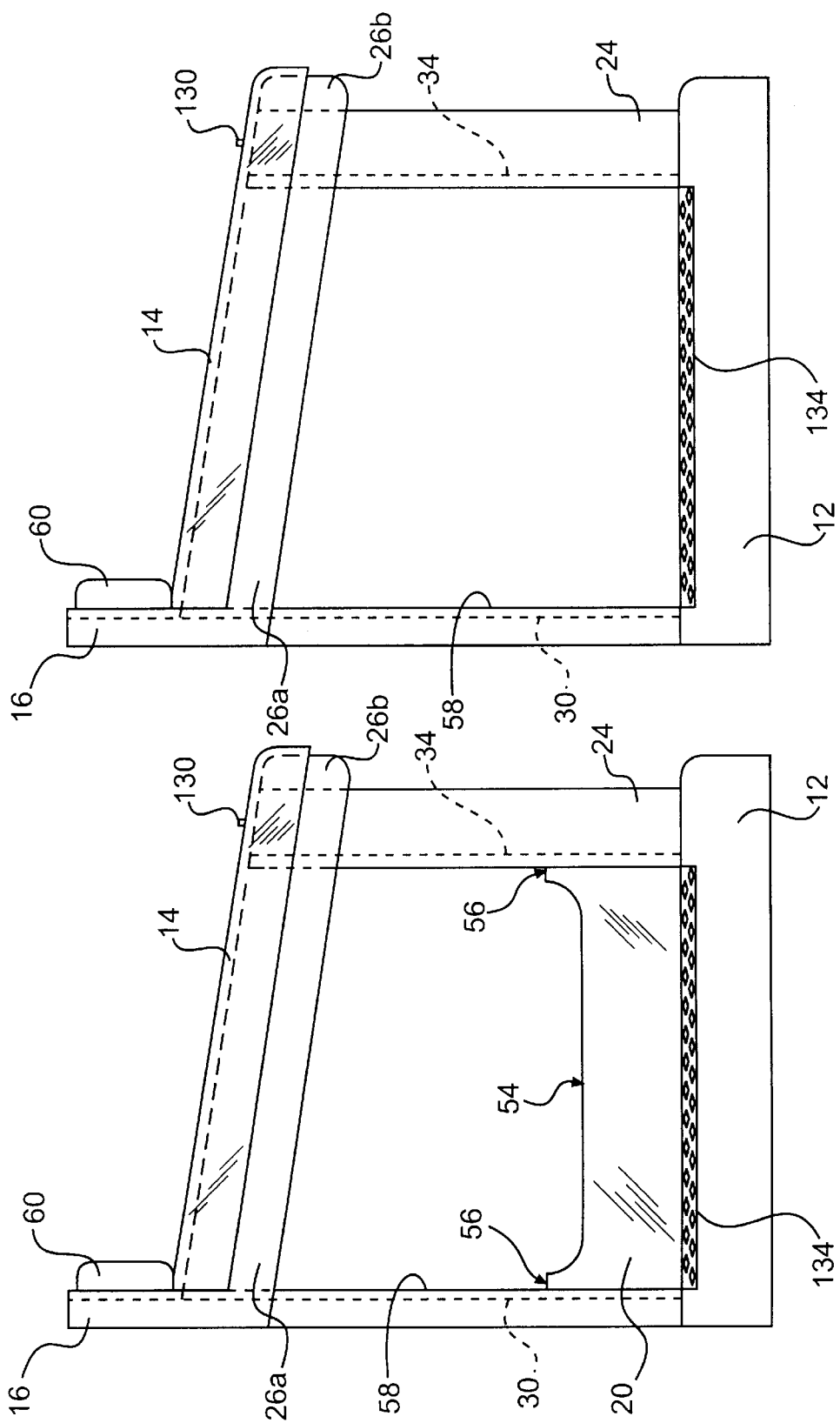

MULTI-PURPOSE, SPECIES-DISCRIMINATING BIRD FEEDER FOR CONTROLLING INGRESS AND EGRESS OF BIRDS INTO INTERIOR OF BIRD FEEDER

This application is a continuation application of 09/352,322, filed Jul. 12, 1999, now abandoned.

This application claim benefit to Provisional application No. 60/122,102 filed Feb. 26, 1999, which claim benefit to provisional application No. 60/131,928 filed Apr. 30, 1999.

BACKGROUND OF THE INVENTION

1. Field of the Invention

This invention relates to a novel multi-purpose, species-discriminating bird feeder. More specifically, this invention relates to a multi-purpose, species-discriminating bird feeder that permits smaller birds, such as bluebirds, to enter and exit the bird feeder, while preventing entry of larger birds, such as robins, grackles, and mockingbirds, and that provides a weather-resistant feeding environment.

2. Description of the Related Art

Certain larger species of birds, such as robins, grackles, and mockingbirds, are voracious eaters. Bird feeders and bird houses that permit access to birds of any size also permit intense use by often aggressive larger-sized birds. The larger birds frighten the smaller birds and monopolize the food source. Accordingly, there is a need for a bird feeder that limits access to species of birds of a relatively small size, such as bluebirds.

Conventional bird feeders often dispense or present food on some type of platform. Some platforms are open; others have roofs. There are generally two types of platform feeders with roofs: fly-thru feeders and enclosed feeders. Known fly-thru feeders provide unwanted access to the food by larger, less desirable birds and expose the food to inclement weather. Many known enclosed bird feeders prevent bird watchers from watching the birds feed and/or make it difficult for birds to access the food.

Mealworms are an extremely attractive food to bluebirds and some other species, such as Carolina Wrens and Catbirds, that are usually not attracted to more conventional bird foods. To provide a satisfactory experience for bird watchers who watch these birds feed, the mealworms must be protected from moisture and from consumption by larger birds. Generally, bluebird feeders on the market today are of the enclosed type of feeder. These bluebird feeders often include round openings on opposite sides of the feeder, through which relatively small bluebirds may enter the feeder. One such bird feeder has a roof, a base, and four sides, two of a transparent plastic material, such as Plexiglas, and two of wood. Round openings are bored through the two wooden sides. The openings are designed to simulate a nest box and are sized so that bluebirds can enter the interior of the bird feeder (where the food is stored), and larger birds are kept out. Bird watchers can watch the bluebirds feast through the two Plexiglas sides.

In this type of bluebird feeder, the positioning of the openings for entry and exit make ingress and egress difficult for the bluebirds. Bluebirds take a long time to find their way into this type of feeder. One researcher observed a bluebird circling an enclosed feeder repeatedly over a span of approximately seven hours after discovering the feeder, trying to find its way into the feeder to get mealworms that it could see through the Plexiglas sides. Even worse, when bluebirds feeding inside the feeder see a predator, such as a cat, the bluebirds become excited and agitated and have difficulty finding their way out of the feeder. In their haste to fly to safety, the bluebirds may harm themselves, mistaking the Plexiglas for an exit or misjudging the positioning of the exit opening. Also, because those feeders do not keep the worms in a confined space, if the openings are low enough to the platform, larger species of birds can reach the worms by sticking their heads through the openings. Thus, improvements to both known fly-thru feeders and enclosed feeders are desirable.

The difficulties suggested in the preceding are not intended to be exhaustive but rather are among many which tend to reduce the effectiveness of conventional bluebird feeders. Other noteworthy problems or needed applications may also exist; however, those presented above should be sufficient to demonstrate that such bird feeders appearing in the past will admit to worthwhile improvement.

SUMMARY OF THE INVENTION

Accordingly, it is therefore a general object of the invention to provide a bird feeder which will obviate or minimize difficulties of the type previously described.

It is a specific object of the invention to provide a bird feeder that is convertible from an enclosed feeder with a small ingress/egress opening (particularly suited to bluebirds and other small bird species), to an enclosed feeder with a larger ingress/egress opening (particularly suited to slightly larger birds), to a fly-thru feeder that accommodates even larger birds, to a platform feeder that accommodates all birds.

It is another object of the invention to provide a bird feeder with ingress/egress openings easily seen by birds; consequently, birds can see the food from outside the feeder and see an escape route from inside the feeder.

It is still another object of the invention to provide a bird feeder that has adjustably-sized ingress/egress openings to permit only birds or mammals of certain size access to food contained within the bird feeder.

It is a further object of the invention to provide a bird feeder that enables a bird watcher to watch the birds feed from multiple viewing angles.

It is yet a further object of the invention to provide a bird feeder that is durable, easy and relatively inexpensive to construct, and aesthetically pleasing.

It is still a further object of the invention to provide a bird feeder that may present a variety of different types of food including live food, such as mealworms, in a manner that prevents the live food from escaping.

It is an additional object of the invention to provide a weather-resistant bird feeder that offers a dry environment in the interior portion of the bird feeder to preserve the bird food, yet still allows bird watchers to watch the birds feed and allows birds quick access to, and exit from, the interior portion of the bird feeder.

It is still an additional object of the invention to provide a bird feeder that is easy to hang from a wall, tree, or fence post. This is a particularly desirable feature for a mealworm feeder, because these feeders are mostly used during bluebird nesting season, when bluebirds prefer open situations, such as fields, and have traditionally nested in cavities in trees and fence posts.

An embodiment of the invention which is intended to accomplish at least some of the foregoing objects includes a base, a top, and a plurality of sides that extend between the base and the top. At least two of the sides include an upper side member and a lower side member. The upper and lower side members are at least partially spaced from each other to provide an ingress/egress opening so that birds of a selected size may enter and exit an interior portion of the bird feeder, while birds larger than the selected size are prevented from entering the interior portion of the bird feeder. Each upper side member is manually selectively adjustable so that a size of the respective ingress/egress opening between the upper side member and the lower side member may be at least one of increased and decreased. The bird feeder preferably includes vertical supports to which the side members are slidably mounted.

In a preferred embodiment, the bird feeder includes a back wall and three sides formed by upper and lower side members. The bird feeder further includes two vertical supports, each having two grooved surfaces with grooves that extend along the length of the grooved surfaces. The back wall also has two grooves on the back wall surface that face the interior of the bird feeder, one adjacent each side of the back wall. Each back wall groove extends from a top of the back wall to at least the base of the bird feeder. The vertical supports are mounted to the base so that one of the vertical support's two grooved surfaces faces a groove in the back wall and the other of the vertical support's two grooved surfaces faces a groove in the opposite vertical support.

In this preferred embodiment, a lower member, an upper member, and a spacer may be slidably inserted into opposing grooves to form the remaining three sides of the bird feeder. The spacer may be slidably mounted either between the upper side member and the top of the bird feeder or between the upper side member and the lower side member, depending on the desired size of the ingress/egress opening. The combined height of the upper side member, the lower side member, and the spacer substantially equals the distance from the base of the bird feeder to the top of the bird feeder so that a bird or small animal cannot push upwards on the upper side member to increase the size of the ingress/egress opening. The ingress/egress opening may only be adjusted manually by a person. The person may selectively manually adjust the size of the ingress/egress opening to suit the size of the birds he hopes to attract to his bird feeder. In this manner, the bird feeder is convertible from an enclosed feeder with a small ingress/egress opening (particularly suited to bluebirds and other small bird species), to an enclosed feeder with a larger ingress/egress opening (particularly suited to slightly larger birds).

In another aspect of the invention, the upper side members and brackets may be removed from the bird feeder to convert the bird feeder from an enclosed feeder to a fly-thru feeder. When the top and the lower side members are removed from the bird feeder, the bird feeder may be converted from a fly-thru feeder to a platform feeder. The upper side members may come in various shapes, so that the ingress/egress opening may be adjusted (here, by switching upper side members with differently shaped upper side members) to suit a particular feeding need. For example, the upper side members may have a bottom edge that is cut higher in the center, for example, cut to have a concave edge surface, which increases the size of the ingress/egress opening and makes the food in the bird feeder accessible to larger (and, in this case, desirable) birds. Additionally, the lower side member may have a concave edge surface on its top edge that opens into the respective ingress/egress opening so that the upper side member and the lower side member define a substantially oval ingress/egress opening.

The upper and lower side members are preferably composed of a transparent material, such as Plexiglas, and those Plexiglas side members are preferably tinted.

As stated above, the bird feeder may include one or more solid side wall(s), the remaining sides of the bird feeder having upper and lower, preferably transparent, side members. In this weather-resistant embodiment, a feed cup may be positioned against the solid wall and remain spaced from the ingress/egress openings formed by the upper and lower side members. Because the feed cup rests against a solid wall, it is protected from wind and rain and helps maintain the dry feeding environment necessary for mealworm preservation. This embodiment affords a more compact design, while still presenting the food a sufficient distance from any ingress/egress openings to prevent use of the feeder by birds or mammals larger than the desired size.

The more compact design may include, for example, a longer solid side wall and shorter adjacent side walls with ingress/egress openings, forming a rectangular bird feeder. The feed cup is spaced a sufficient distance from the openings in the shorter side walls such that larger-sized birds cannot reach the feed cup. This bird feeder may accommodate a large feed cup, yet be compact overall.

Another modification of this embodiment, which has a solid back wall, is that the back wall may be used to mount different feeding arrangements, depending on the species of bird that the bird watcher wants to attract. Possible feeding arrangements include a feed cup, a suet basket, or a mesh cage mounted to a backing. In this embodiment, a pair of rotatable clips are permanently affixed to the back wall for releasably engaging the backing. The clips are manually rotatable between a locking position and a release position. In this manner, the feeding arrangements may be easily interchanged.

Further, this weather-resistant embodiment improves mounting flexibility and makes the feeder easier to hang. When the solid wall is extended up from a plane formed by the top edge of the other walls or down from the base of the feeder, and has a hole drilled in it, the feeder can be easily hung on a wall, a tree, or a fence post. This is particularly useful for a mealworm feeder because these feeders are mostly used during bluebird nesting season, when bluebirds prefer open situations, such as fields, and have traditionally nested in cavities in fence posts. Current enclosed mealworm feeders on the market are difficult to mount on fence posts and trees.

In another embodiment, the bird feeder includes a mounting platform connected to an upper surface of the base. A suet cake or other food may be located on the mounting platform. Like the feed cup in the first embodiment, the suet cake is positioned a sufficient distance away from the ingress/egress openings in the bird feeder so that only animals of a desired size have access to it.

A method of controlling ingress and egress of birds into and from an interior of a bird feeder comprises forming a bird feeder with a base, a top, and a plurality of side members; constructing at least some of the side members in the form of upper and lower side members with an ingress/egress opening therebetween; and manually selectively adjusting a size of the ingress/egress opening between the upper and lower side members small enough to restrict entry into the interior of the bird feeder to selected sizes, and therefore species of, birds and mammals. The method may comprise adjusting the size of the ingress/egress opening by, repositioning or reconfiguring (i.e., changing the shape of) selected ones of the side members.

A bird feeder in accordance with the invention may also comprise a base, a top, and sides, where at least two sides are formed by an upper side member and a lower side member and each upper side member is manually selectively replaceable with a different upper side member dimensioned to change a width of the respective ingress/egress opening between the upper side member and the lower side member so that birds different from an originally selected size may have access to the interior portion of the bird feeder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 9 is a side view of the bird feeder of FIG. 1 in a first configuration;

FIG. 10 is a side view of the bird feeder of FIG. 1 in a second configuration;

FIG. 10A is a side view of the bird feeder of FIG. 1 in the second configuration in accordance with an additional preferred embodiment of the invention;

FIG. 11 is a side view of the bird feeder in FIG. 1 converted to a fly-thru feeder;

FIG. 12 is a side view of the bird feeder of FIG. 1 converted to a fly-thru feeder with no side members between the top and the base;

DETAILED DESCRIPTION OF THE PREFERRED EMBODIMENT

Figure 1:
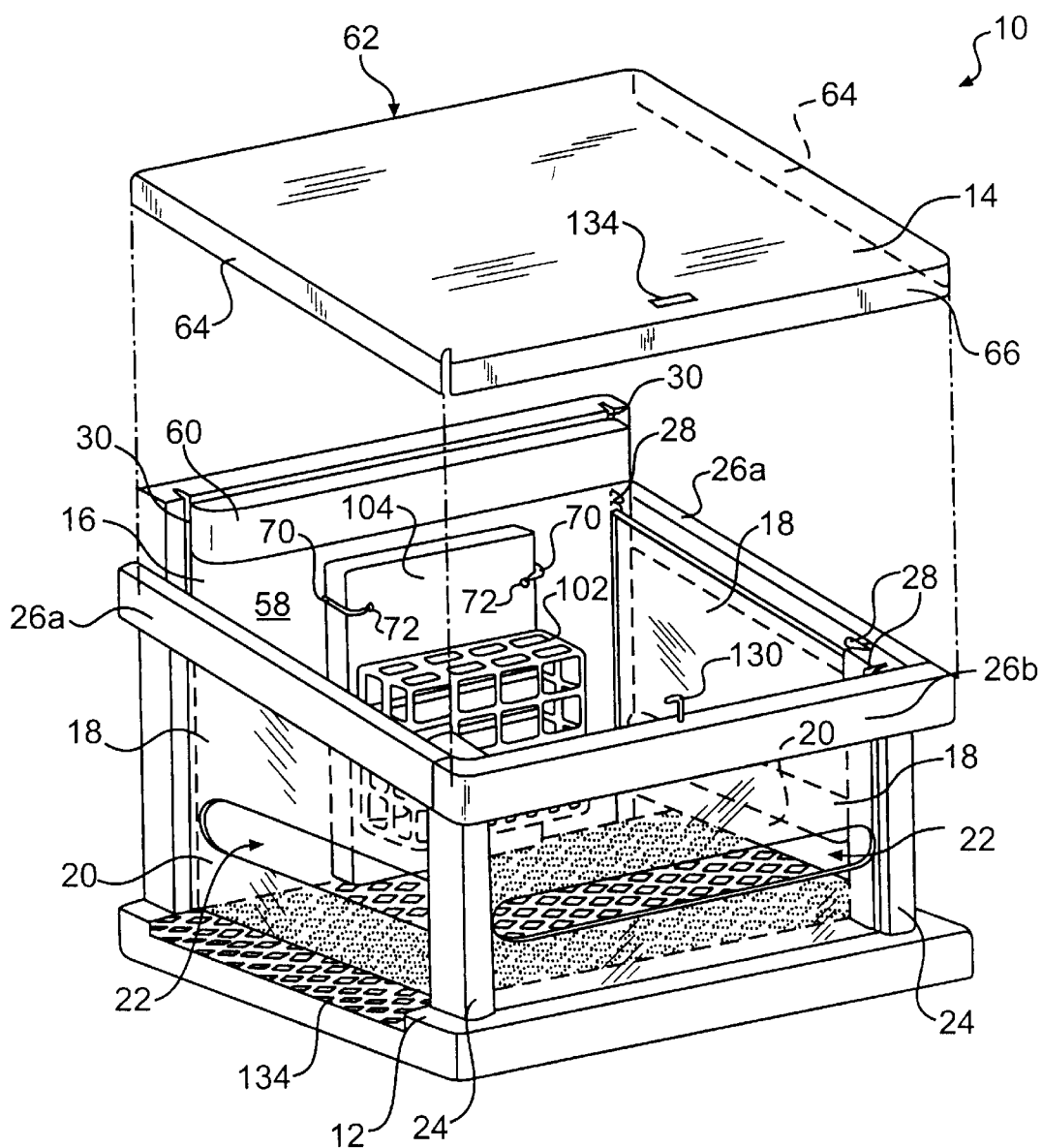
FIG. 1 is a perspective view of a multi-purpose, species-discriminating bird feeder in accordance with a preferred embodiment of the invention.

Referring now to the figures, wherein like numerals indicate like parts, FIG. 1 illustrates a bird feeder, generally indicated 10, in accordance with the invention. This bird feeder 10 includes a base 12, a generally planar top or roof 14, and a plurality of sides extending between the base 12 and the top 14. The sides of the bird feeder 10 include a back wall 16 and three other sides, each having an upper member 18 and a lower member 20. The upper side members 18 and the respective lower side members 20 are at least partially spaced from each other to provide an ingress/egress opening 22 therebetween. The ingress/egress openings allow birds of a selected size to enter and exit an interior portion of the bird feeder 10 through the sides of the feeder, while preventing birds or mammals larger than the selected size from entering the interior portion. As will be explained below, the upper side members 18 are manually selectively adjustable by a person so that a size of the respective ingress/egress opening between the upper and lower side members 18 and 20 may be adjusted.

The adjustability of the upper side members 18, and hence of the ingress/egress opening size, increases the versatility of the bird feeder 10. More specifically, the bird feeder 10 may be converted from an enclosed feeder having a small ingress/egress opening, particularly suited to bluebirds and other small bird species, to an enclosed feeder having a larger ingress/egress opening, particularly suited to slightly larger birds. A person may select the size of the ingress/egress opening based on the species of bird he wants to attract to his feeder. In addition, the bird feeder 10 is constructed so that it may be further converted to a fly-thru feeder that accommodates even larger birds or to a platform feeder that accommodates all birds.

The bird feeder shown in FIG. 1 includes a pair of vertical support members 24 that extend up from the base 12 at positions near the corners of the base 12 opposite the back wall 16. The bird feeder 10 further includes frame members. A pair of side frame members 26a extend from the back wall 16 to each of the vertical support members 24, and a third, front frame member 26b extends between the vertical support members 24. The frame members 26a and 26b preferably are joined to the vertical support members 24 at an upper end of the support members 24.

Figure 2:
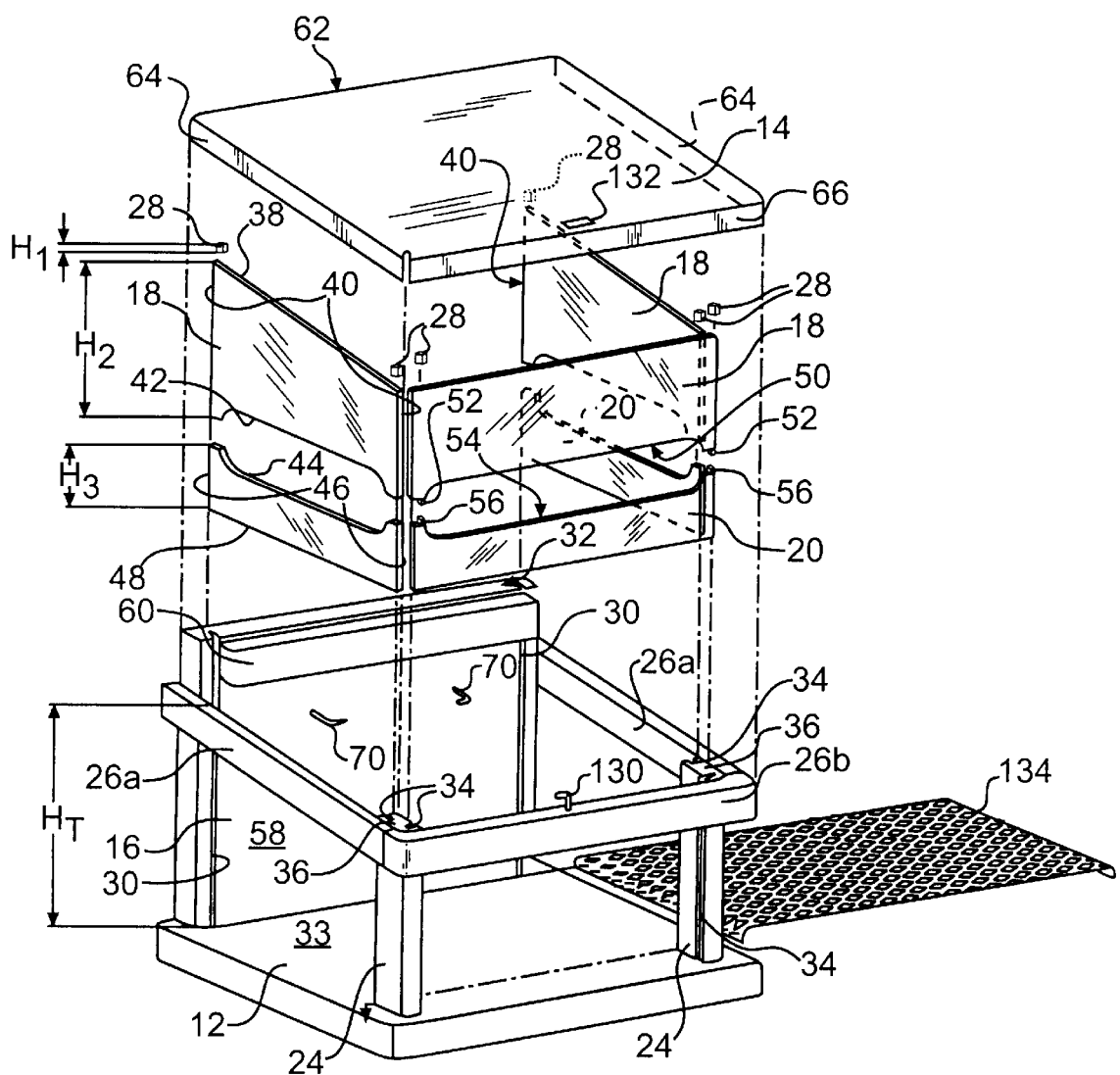
FIG. 2 is an exploded view of the bird feeder of FIG. 1.

As seen best in FIG. 2, this bird feeder 10 further includes spacers 28. The spacers 28 are used in conjunction with the upper and lower side members 18 and 20 to define the size of the ingress/egress openings 22. FIG. 1 shows the upper and lower side members 18 and 20 and the spacers 28 in a first orientation, in which the ingress/egress openings 22 of the bird feeder 10 are relatively narrow. Only smaller birds may enter the interior portion of the bird feeder 10 when the bird feeder 10 is in this orientation. In this manner, the bird feeder 10 acts as a species-discriminating bird feeder. FIG. 2 is an exploded view, showing the upper and lower members 18 and 20 and the spacers 28 removed from the bird feeder 10. The upper and lower members 18 and 20 and the spacers 28 may be releasably positioned between the back wall 16 and the vertical support members 24 or between the two vertical support members 24, as appropriate.

As seen best in FIG. 2, the back wall 16 has two grooves 30 that extend vertically from the top 32 of the back wall 16 to the top surface 33 of the base 12 of the bird feeder 10. Each of the vertical support members 24 also has a pair of grooves 34 that extend vertically from a top surface 36 of the vertical support members 24 to the top surface 33 of the base 12. One groove 34 of each vertical support member 24 faces the back wall 16 and the other groove 34 faces the opposite support member 24.

The upper side members 18 each include a top edge 38, side edges 40, and a bottom edge 42 (the leftmost upper side member 18 of FIG. 2 is representative and is labeled appropriately). Likewise, each lower side member 20 includes a top edge 44, side edges 46, and a bottom edge 48 (the leftmost lower side member 20 of FIG. 2 is representative and is labeled appropriately). The back wall grooves 30 and vertical support member grooves 34 each slidably receive a side edge 46 of a respective lower side member 20, a side edge 40 of respective upper side member 18, and a spacer 28, as indicated in FIG. 2, to form the sides of the bird feeder. The thickness of the side members 18 and 20 and the spacers 28 is slightly less than the width of the grooves 30 and 34 so that the side members 18 and 20 and the spacers 28 may be slidably positioned in the appropriate grooves 30 and 34.

A feature of this embodiment of the invention is that the combined height of the side edge 46 of a lower side member 20, the side edge 40 of an upper side member 18 that is positioned above that lower side member 20, and a spacer 28 substantially equals the height from the top surface 33 of the base 12 to the bottom surface of the top 14 of the bird feeder, along the respective groove, either 30 or 34, into which the particular lower side member, the particular upper side member, and the particular spacer are slid. For example, in FIG. 2, the combined heights of the upper side member $H_1$, the lower side member $H_2$, and the spacer $H_3$ substantially equal the height $H_T$ along the back wall groove 30 from top surface 33 of the base 12 to the closed position of the top 14. Thus, when the lower side members 20, the upper side members 18, and the spacers 28 are positioned in place in the respective grooves (as shown in FIG. 2), and the top 14 is mounted in place on the frame members 26a and 26b, the upper side members 18 remain fixed in place. Birds or other animals cannot push up on the upper side members 18 to enlarge the ingress/egress openings 22 because there is no room for movement along the grooves 30 and 34 between the base 12 and top 14 of the bird feeder. In this manner, the upper and lower side members 18 and 20 and the spacers 28 are configured so that the ingress/egress openings 22 are controlled solely by the user and not by birds or mammals. The possible positioning of the spacers 28 will be explained further in connection with FIGS. 9–10.

As shown in FIGS. 1 and 2, the bottom edges 40 of the upper side members 18 each have a concave edge surface 50 that terminates in abutting surfaces 52 at both ends of the concave edge surface 50 (the central upper side member 18 of FIG. 2 is representative and is labeled appropriately). Similarly, the top edges 44 of the lower side members 20 each have a concave edge surface 54 that terminates in abutting surfaces 56 at both ends of the concave edge surface 54 (the central lower side member 20 of FIG. 2 is representative and is labeled appropriately). The abutting surfaces 52 and 56 abut each other when the upper and lower side members 18 and 20 are located in the first orientation depicted in FIG. 1. The concave edge surfaces 50 and 54 define a perimeter of the ingress/egress opening 22. The abutting surfaces 52 and 56 touch, yet enable the upper and lower side members 18 and 20 to remain at least partially spaced from each other, even without a spacer 28 therebetween.

The upper and lower members 18 and 20 are preferably composed of a light, transparent, weather-resistant thermoplastic material, such as Plexiglas, so that bird watchers can watch the birds feed from any viewing angle. The transparency of the upper and lower members 18 and 20 also makes food inside the bird feeder visible and conspicuous to the birds. In addition, these transparent side members are preferably tinted so that each ingress/egress opening 22 is visibly apparent to birds inside the bird feeder. Birds fly to light. If a bird predator, such as a cat, prowls near the bird feeder while birds are feeding, the tinted Plexiglas enables the bluebirds to visually distinguish the side members from the ingress/egress opening. Because the tinting of the side members aids the birds in identifying an escape route, the present bird feeder minimizes the risk of harm to distressed birds. In another aspect of the invention, the top 14 may be made of a translucent material or a transparent material, for example, Plexiglas, so that light can enter the feeder and a bird watcher may more easily see the colors and markings of birds feasting inside of the bird feeder.

The bird feeder of the present invention may be rectangular, square, circular, or configured in other suitable shapes. In the bird feeder 10 shown in FIGS. 1 and 2, the bird feeder is shaped such that the height of the vertical support members 24 is somewhat shorter than the height of the back wall 16. Hence, the side frame members 26a tilt downwardly from the back wall 16 toward the vertical support members 24. Put another way, while the back wall 16 and the vertical support members 24 are parallel, the frame members 26a and the base 12 are not parallel. Accordingly, the upper side members 18 that form first and second sides of the bird feeder 10 extending between the back wall 16 and an appropriate vertical support member 24 have a different shape than the upper side member 18 that form the third (or front) side of the bird feeder 10 extending between the two vertical support members 24. Specifically, the side edges 40 of the upper side member 18 used to form the front of the bird feeder 10 are equal. By comparison, the side edges 40 of the upper side members 18 used to form the first and second sides of the bird feeder 10 are longer in the back than in the front, so that the top edges 38 of the upper side members 18 follow the forward tilt of the side frame members 26a. This difference in shape of the upper frame members is most evident in FIG. 2. It will be understood that the heights of the side edges of the upper side members appropriately suit the overall shape of the bird feeder, and, in a rectangular feeder, the side edges 40 of the upper side members 18 used to form the first and second sides of the bird feeder are equal in front and back.

On a front surface 58 of the back wall 16 of the bird feeder 10, a reinforcing bar 60 is mounted by, for example, screws (not shown). The reinforcing bar 60 assists in holding the top 14 of the bird feeder 10 in place. Additionally, the reinforcing bar 60 provides extra thickness to the back wall 16 so that, if a user wants to mount the bird feeder to a fence or the like, nails or other suitable attachment members may be pounded through both the reinforcing bar 60 and the back wall 16, thereby providing a secure mount for the bird feeder 10. The reinforcing bar 60 is mounted so as not to obstruct the grooves 30 in the back wall 16.

The top 14 of the bird feeder 10 shown in FIGS. 1 and 2, which is completely removable from the rest of the bird feeder, has a back edge 62 that abuts the front surface 58 of the back wall 16 of the bird feeder 10, flanged side edges 64, and a flanged front edge 66. The flanged side edges 64 and front edge 66 overhang and extend down from the respective side and front frame members 26a and 26b. The front corners of the top 14 have a slit therein resulting from manufacture of the flanged edges 64 and 66. In a closed position, the top 14 rests on the top edges of the frame members 26a and 26b and the tops 36 of the vertical support members 24, as well as on the top edges 38 of the upper side members 18 or on the spacers 28, whichever is positioned closest to the top 14.

Another feature of the present invention is that that bird feeder is configured to provide multiple, exchangeable feeding arrangements, including a feed cup mount arrangement as shown in FIGS. 3A–3C and 4, a suet basket mount arrangement as shown in FIGS. 5A–5C and 6, and a mesh cage mount arrangement as shown in FIGS. 7A–7C and 8. The feeding arrangements may be secured to the front surface 58 of the back wall 16, where the food remains protected from the environment and from species of birds larger than the species that may access the food through the ingress/egress openings 22.

To secure a specific feeding arrangement in place, the back wall 16 of the bird feeder 10 includes a pair of clips 70. These clips 70 are permanently secured to the front surface 58 of the back wall 16, yet may be rotated relative to the back wall 16. The clips 70 are generally L-shaped. In a locking position, as shown in FIG. 1, the outer legs 72 of the clips 70 face each other, and, in a release position for insertion or removal of a feeding arrangement, the outer legs 72 of the clips 70 are rotated away from each other.

Figure 3C:
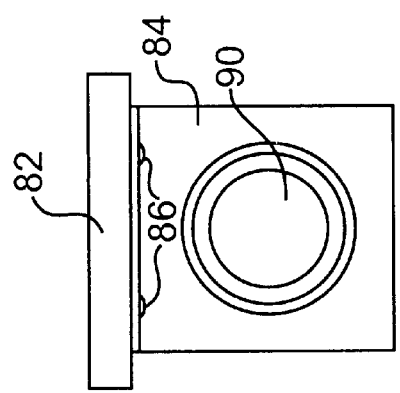
FIGS. 3A–3C show a feed cup mount arrangement in accordance with the invention.
Figure 3B:
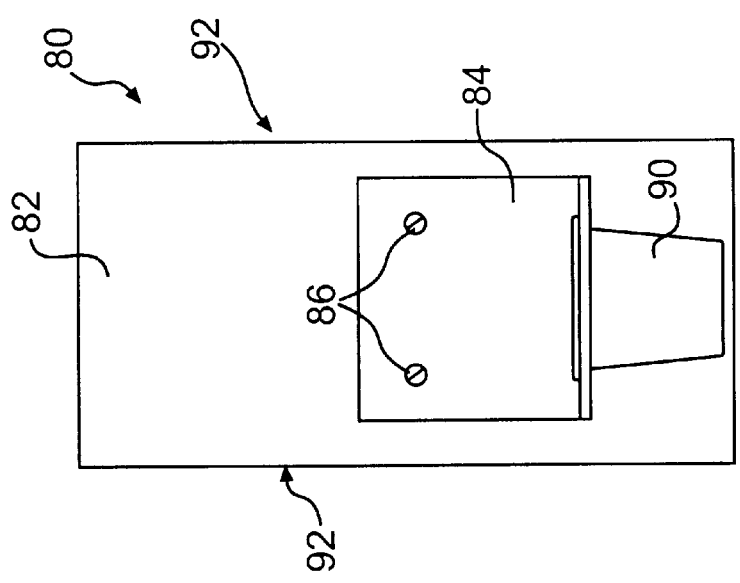
Figure 3A:
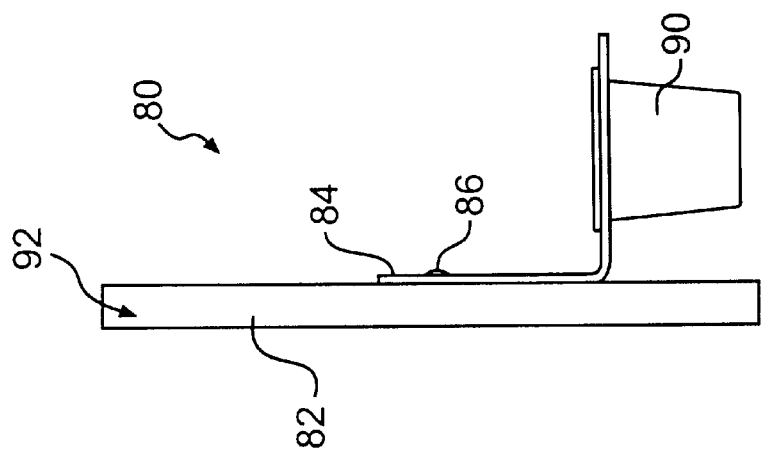
Figure 4:
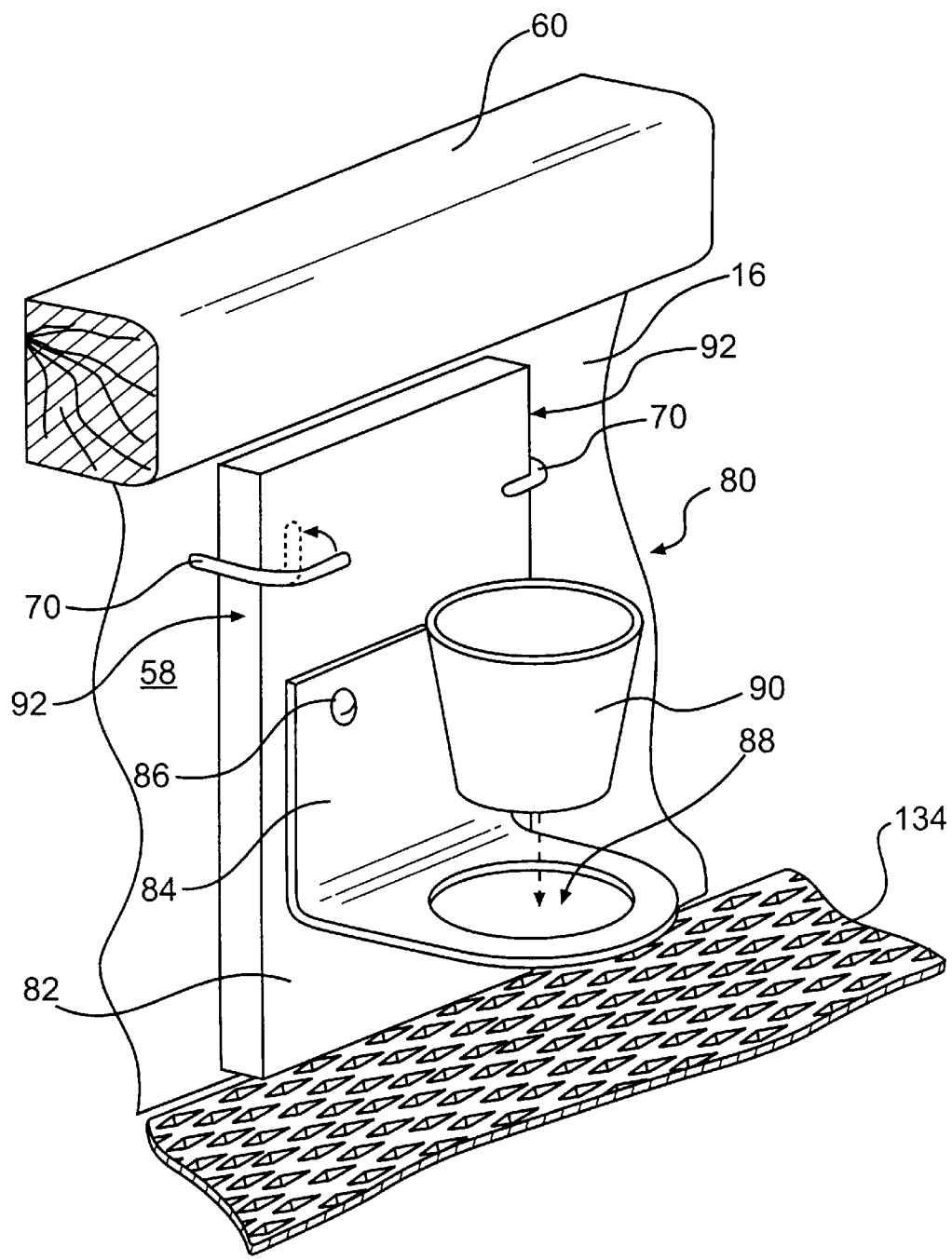
FIG. 4 is a front perspective view of a feed cup mount arrangement installed against a back wall of a bird feeder in accordance with the invention.

FIG. 4 shows a feed cup mount arrangement, generally indicated 80, secured to the back wall 16. FIGS. 3A–3C show the feed cup mount arrangement 80 in more detail. The feed cup mount arrangement 80 includes a generally rectangular backing 82, preferably composed of wood. A bracket 84 is affixed to the backing 82 by, for example, screws 86. The bracket 84 is generally L-shaped and includes a hole 88 therethrough for receipt of a feed cup 90, which may be removed and replaced by a user. The bracket 84 is preferably a plastic material, such as Plexiglas. To remove the feed cup mount arrangement 80 from its place against the back wall 16, the clips 70 are rotated at least 90 degrees to an open position, shown in phantom lines in FIG. 4, to clear the side edges 92 of the backing 82. The entire feed cup mount arrangement 80 may then be removed from the bird feeder 10 for cleaning or replacement with another feeding arrangement.

Figure 5C:
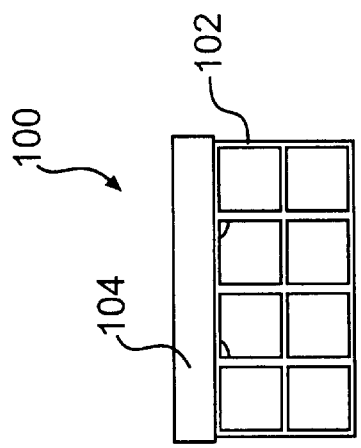
FIGS. 5A–5C show a suet basket mount arrangement in accordance with the invention.
Figure 5B:
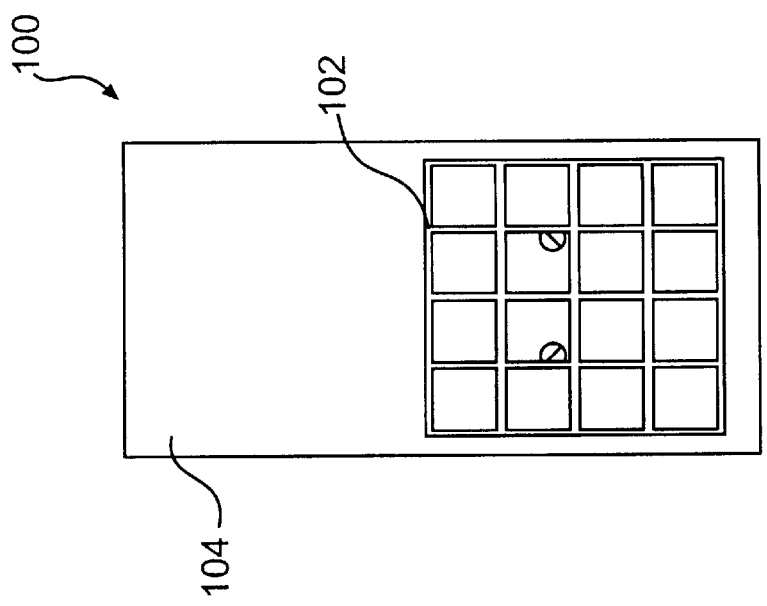
Figure 5A:
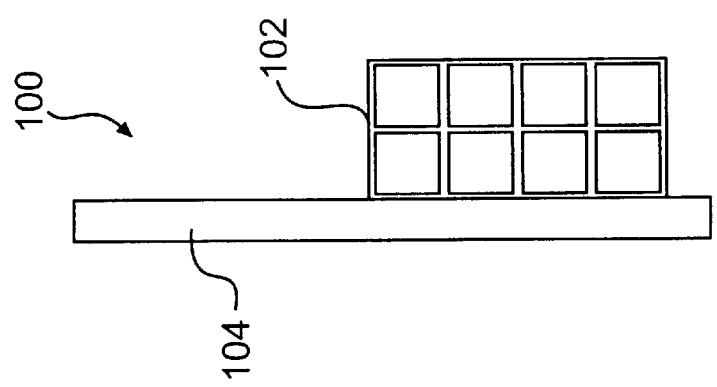
Figure 6:
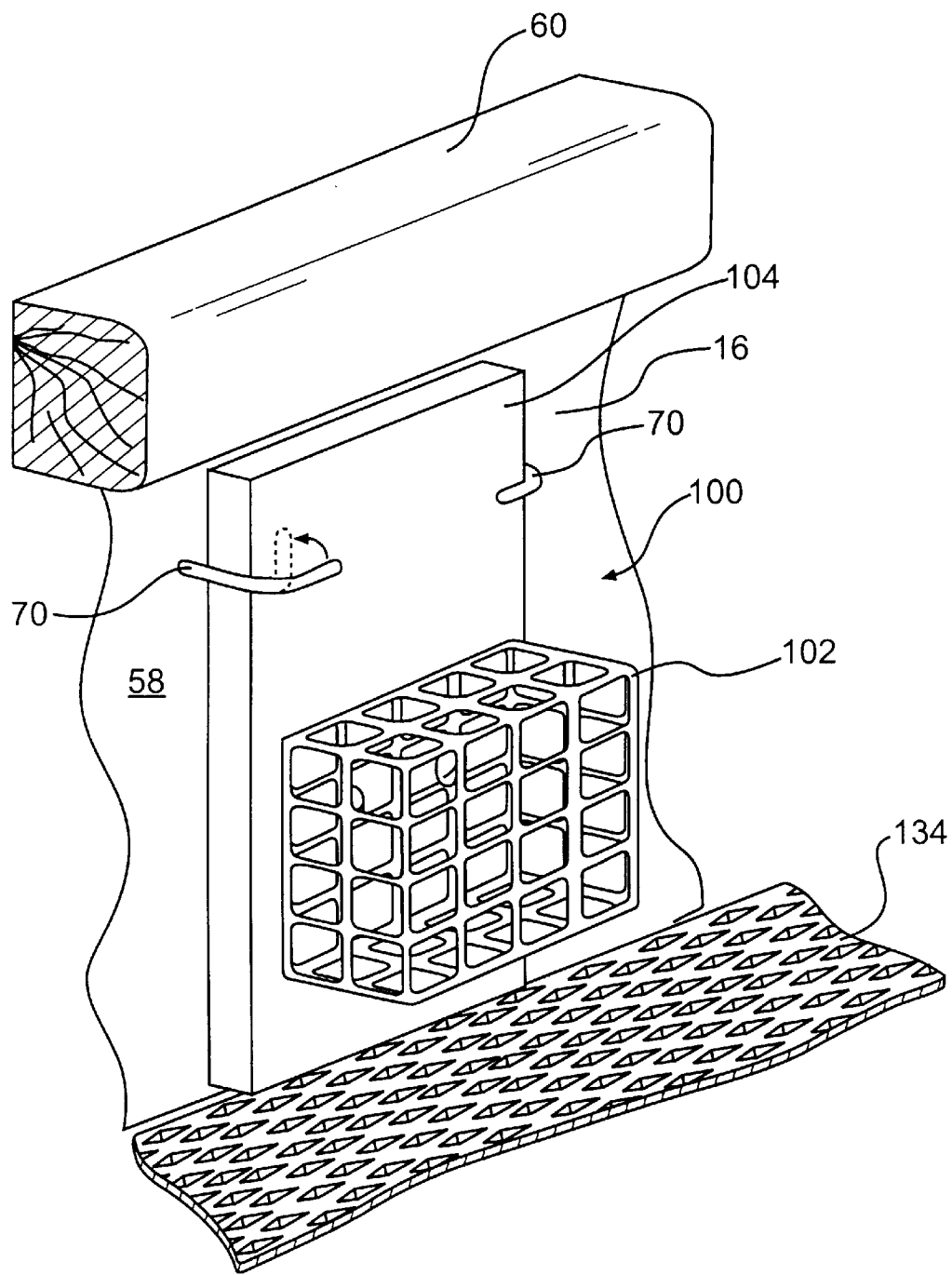
FIG. 6 is a front perspective view of a suet basket mount arrangement installed against a back wall of a bird feeder in accordance with the invention.
Figure 7A:
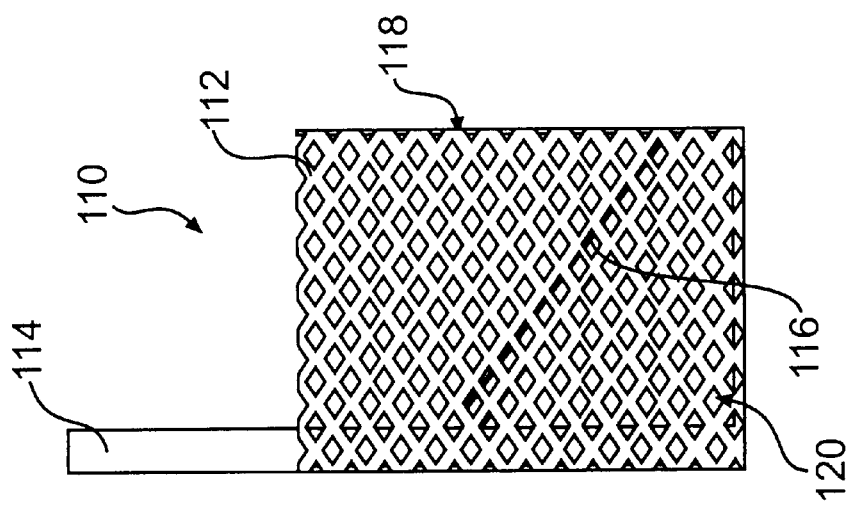
FIGS. 7A–7C show a mesh cage mount arrangement in accordance with the invention.
Figure 7B:
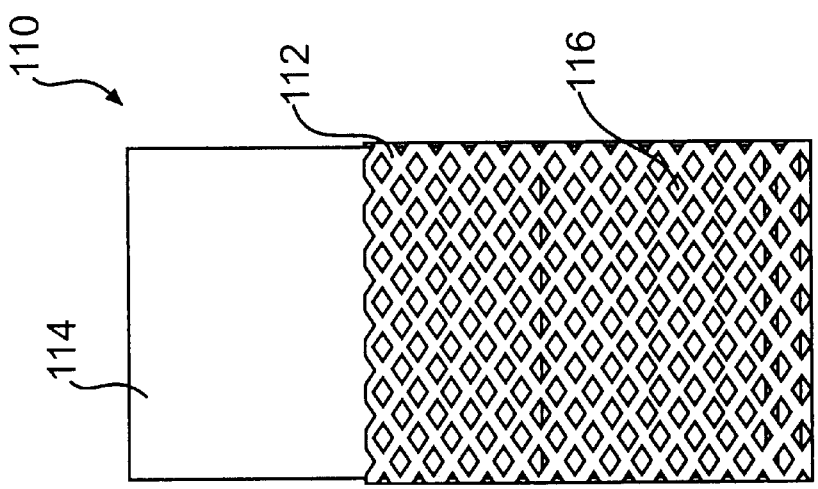
Figure 7C:
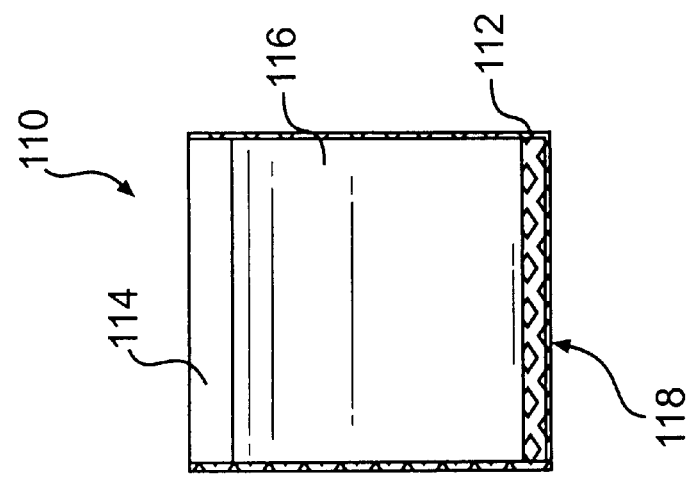

FIG. 6 shows a suet basket mount arrangement, generally indicated 100, secured to the back wall 16. FIGS. 5A–5C show the suet basket mount arrangement 100 in more detail. A suet basket 102 is permanently mounted to a backing 104 and, like conventional suet baskets, includes a latched opening (not shown) on one side for replacement of a suet cake. Like the feed cup mount arrangement 80, the suet basket mount arrangement 100 may be removed by rotating clips 70 from the locking position, shown in solid line in FIG. 6, to a release position, shown in phantom line.

Figure 8:
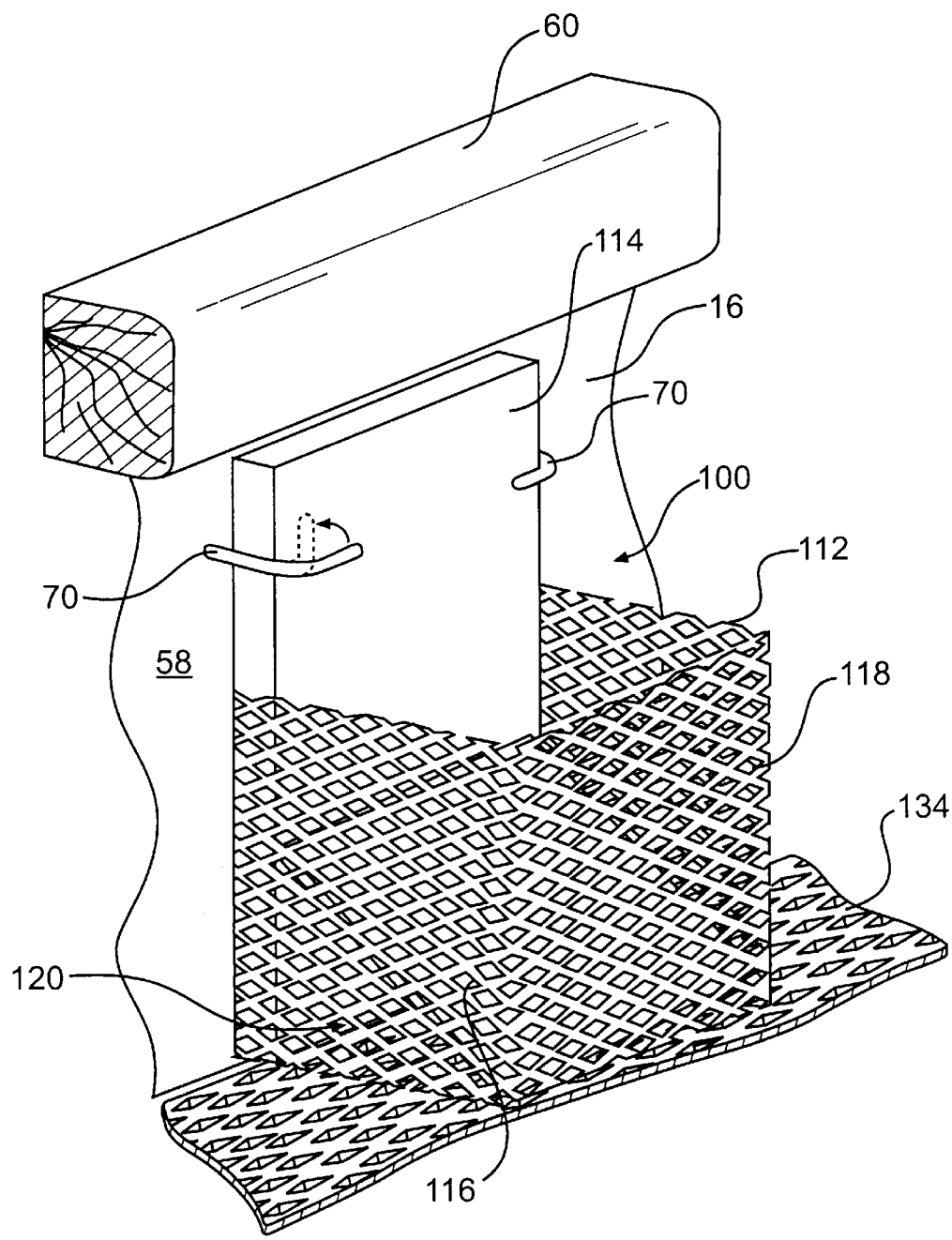
FIG. 8 is a front perspective view of a mesh cage mount arrangement installed against a back wall of a bird feeder in accordance with the invention.

FIG. 8 shows yet another feeding arrangement. A mesh cage mount arrangement for sunflower or other seeds, generally indicated 110, is shown mounted to the back wall 16. A mesh cage 112 is permanently mounted to the backing 114, as shown in detail FIGS. 7A–7C. The mesh cage 112 includes a deflector 116 that is mounted on and extends from the backing 114 to a position near, but slightly spaced from, the front wall 118 of the cage 112. The deflector 116 tilts downwardly from back to front and is designed to push seeds toward the front wall 118 of the cage 112, where the seeds may be easily accessed by birds. The deflector 116 prevents seeds from becoming caught along a back wall area, generally indicated 120, of the mesh cage 112. The deflector 116 is preferably metal; and the mesh cage 112 itself may be made of uncoated expandable steel mesh, such as disclosed in U.S. Pat. No. 5,826,539, hereby incorporated by reference in its entirety. Again, like the feed cup mount arrangement 80, the mesh cage mount arrangement 110 may be removed by rotating clips 70 from the locking position, shown in solid line in FIG. 8, to a release position, shown in phantom line.

These interchangeable feeding arrangements increase the versatility of the bird feeder so that a user can target a specific type of bird to attract to the feeder. The ability to manually selectively adjust the size of the ingress/egress openings also increases the versatility of the feeder, as will now be described in connection with FIGS. 9–12.

When the upper and lower side members and the spacers are slid into place in the appropriate grooves of the back wall and vertical support members, and the top is mounted in position on the frame members, the upper side members may not be pushed upwards by birds or mammals to increase the size of the ingress/egress opening. FIGS. 9 and 10 show upper and lower side members 18 and 20 and spacers 28 mounted in place within grooves 30 in the back wall 16 and grooves 34 in the respective vertical support members 24. For each groove 30 and 34, the height of the side edges 40 of the upper and lower side members 18 and 20, plus the height of the spacer 28, substantially equals the height from the top surface 33 of the base 12 to the bottom surface of the top 14 along the groove 30 and 34. Accordingly, when the top 14 of the bird feeder 10 is in place, there is no room for movement of the upper and lower side members or the spacers along the grooves 30 and 34, and, hence, birds or small animals cannot push the upper side member 18 upwards to increase the size of the ingress/egress opening 22. However, the ingress/egress openings may be adjusted manually by a person. FIGS. 9–12 show four possible configurations of the upper and lower side members of the bird feeder 10.

FIG. 9 shows a side of the bird feeder 10 in a first configuration in which spacers 28 are positioned between the upper side members 18 and the top 14. Were a bird or small animal to push on the bottom edge 42 of the upper side member 18, no movement would occur. In this first configuration, the ingress/egress opening is at its smallest size.

Turning to FIG. 10, which shows a second configuration, the spacers 28 have been repositioned between the upper and lower side members 18 and 20. Moving the spacers 28 may be achieved simply by removing the top 14, sliding the spacers 28 and the upper side member 18 out of the grooves 30 and 34, inserting the spacers 28 into the respective grooves 30 and 34, and inserting the upper side member 18 into the grooves 30 and 34 on top of the spacers 28. The size of the ingress/egress opening in this second configuration is larger than the size of the opening in the first configuration, allowing a wider variety of birds to access food within the bird feeder 10.

It will be understood that the spacers 28 illustrated in FIGS. 9 and 10 are only representative of the possible spacer shapes. The spacers may be configured in different shapes, as long as they are dimensioned such that they fit within the grooves 30 and 34 at the appropriate location and prevent movement of the upper side member 18 in an upward direction by birds and small animals. For example, in another preferred embodiment, the upper side members 18 may be held in place by push pins 300 that may be inserted at the appropriate location in a groove 34 of the vertical support member 24 or groove 30 of the back wall 16. FIG. 10A shows such a pushpin 300 holding an upper side member 18 in place. The pushpin operates as a spacer to allow a user to manually selectively adjust the size of the ingress/egress opening. When the user wants to decrease the size of the ingress/egress opening, the user may remove the pushpin 300, push down on the upper side member 18 until the abutting surfaces 52 and 54 come into contact, and reinsert the pushpin 300 in the groove 34 at a location above the top edge 38 of the upper side member 18. In addition, the upper side members 18 may be bounded at the top and bottom by push pins on both side edges 40 so that the upper side members 18 remain fixed in place in the grooves 30 and 34, protected against movement by birds or small mammals.

FIG. 11 shows the bird feeder 10 in a third configuration. Here, the bird feeder has been converted to a fly-thru configuration. The upper side member 18 and spacers 28 have been removed from the bird feeder by removing the top 14, sliding the spacers 28 and upper side member 18 out of the grooves 30 and 34, and replacing the top 14. FIG. 12 shows the bird feeder 10 converted to an even more open fly-thru feeder, in which both the upper and lower side members 18 and 20 have been removed. Finally, to convert the bird feeder of FIG. 12 to a platform feeder, the user needs simply to remove the roof 14. The convertibility of the bird feeder of the present invention between these configurations greatly increases the versatility of the bird feeder relative to feeders appearing in the past.

Figure 13:
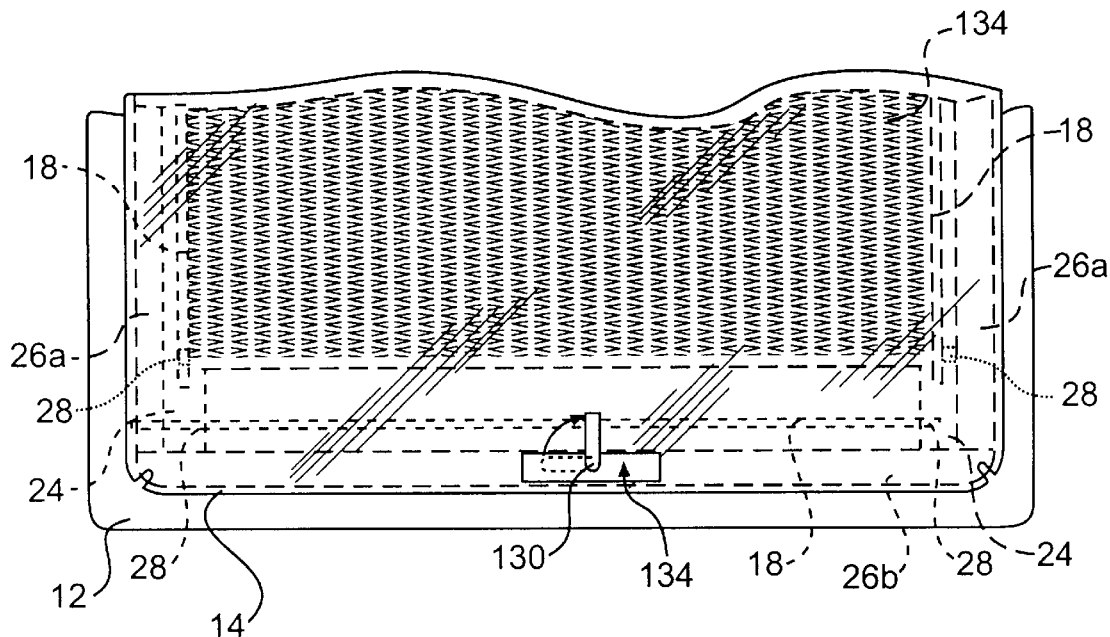
FIG. 13 is a partial top view of the bird feeder of FIG. 1.

FIG. 13 is a top view of the bird feeder 10 and illustrates how the top 14 of the bird feeder 10 may be releasably locked in place. The front frame member 26b has a clip 130 permanently mounted thereto that, in a release position shown in phantom line, extends through a slot 132 in the top 14 and, in a locking position shown in solid line, locks the top 14 in place. The clip 130 is shaped similarly to clips 70 in the back wall 16 and, like clips 70, the clip 130 may be rotated to change between the release position and the locking position.

Figure 9A:
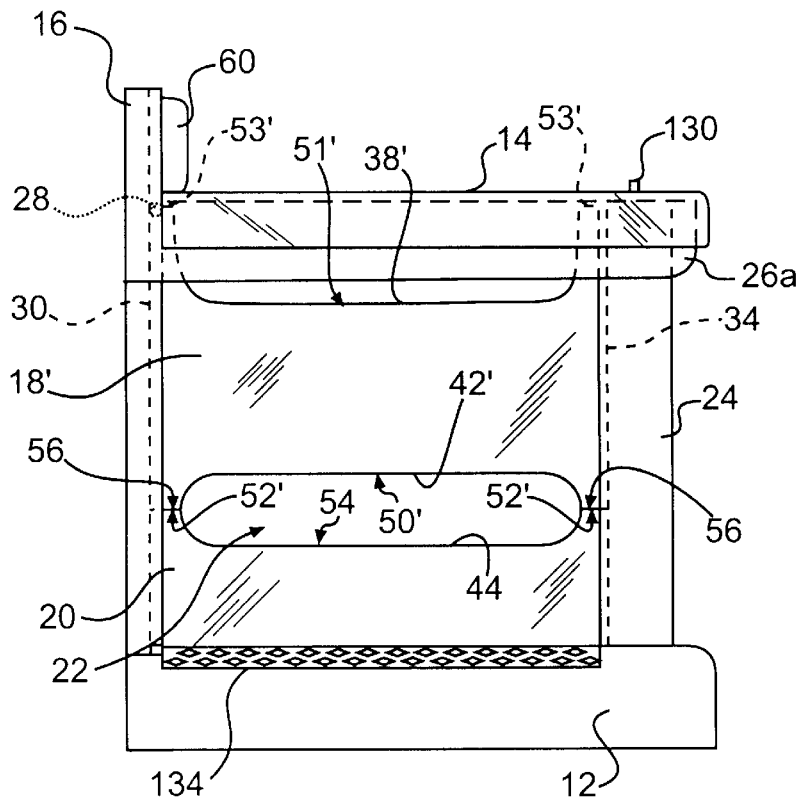
FIG. 9A is a side view of a bird feeder in a first configuration in accordance with another preferred embodiment of the invention.

FIG. 9A shows another preferred embodiment of the invention in the first configuration, where the ingress/egress opening 22 is at its smallest size. In this embodiment, the top edge 38' of the upper side member 18' includes a concave edge surface 51' that terminates in abutting surfaces 53' at both ends of the concave edge surface 51'. To convert the bird feeder into a second configuration, having a larger sized ingress/egress opening, the upper side member 18' may be removed from grooves 30 and 34, rotated 180 degrees, and slid back into grooves 30 and 34 so that the concave edge surface 51' now defines the top half of the ingress/egress opening 22. The concave edge surface 51' has a greater concave dimension relative to the abutting surfaces 53' than the concave edge surface 42' has to the abutting surfaces 52' such that, when the concave edge surface 51' defines the opening 22, the opening 22 is larger than when the concave edge surface 42' defines the opening. In this embodiment, the size of the ingress/egress opening 22 between the upper and lower side members 18' and 20 may be adjusted without the use of spacers.

As another aspect of the present invention, the bird feeder 10 may include a removable floor screen 134 that rests on the top surface 33 of the base 12. The floor screen 134 is adapted to catch bird waste. The floor screen 134 may be lifted out of the feeder 10 (see FIG. 2) and cleaned. The floor screen 134 lies smoothly against the top surface 33 and preferably folds slightly around opposite edges of the base 12 to prevent the screen 134 from shifting position during bird feeding. The floor screen 134 is preferably composed of expandable steel mesh, such as disclosed in U.S. Pat. No. 5,826,539, hereby incorporated by reference in its entirety, although it may be made of other suitable materials, such as perforated steel.

FIGS. 1–13 are meant to provide representative dimensions of the overall bird feeder. As with the bird feeder 260 shown in FIG. 17 and discussed below, the bird feeder of FIGS. 1–13 may be made as a more compact design in that the inclusion of a solid back wall 16 enables smaller width dimensions, i.e., side dimensions, relative to feeders with four Plexiglas sides.

Figure 14:
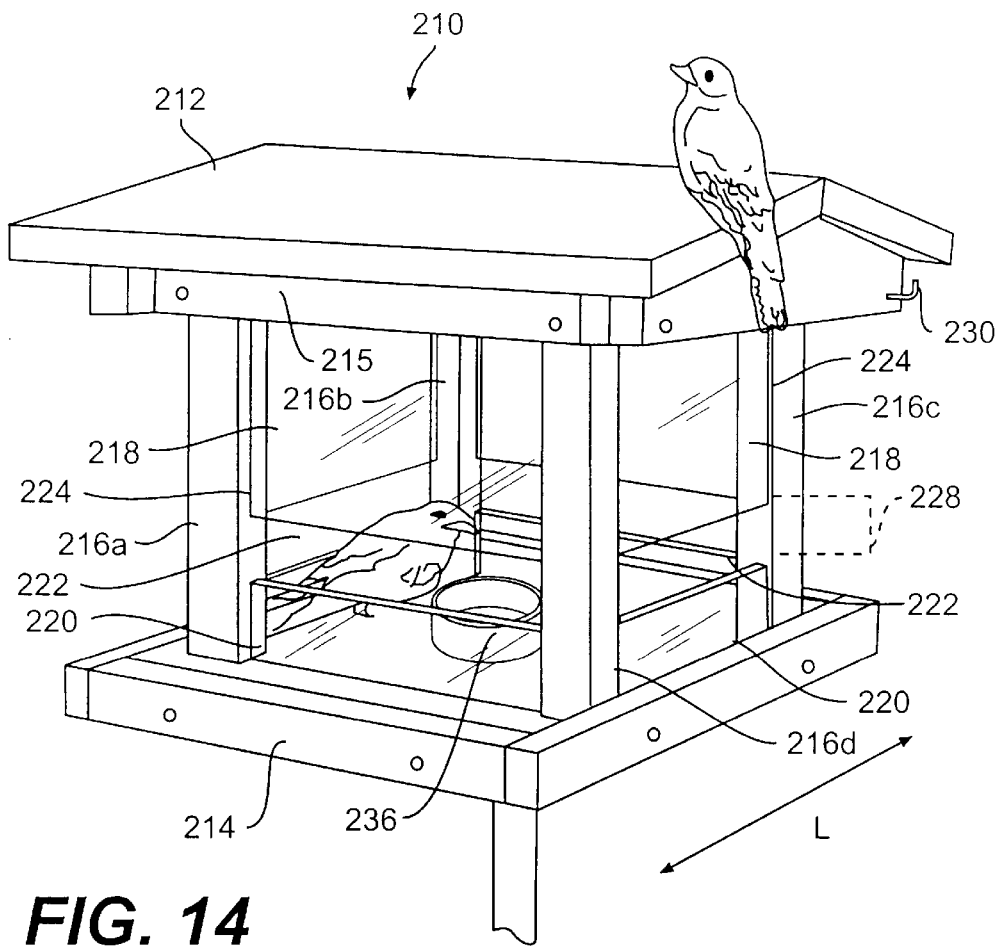
FIG. 14 is a perspective view of a multi-purpose, species-discriminating bird feeder in accordance with yet another preferred embodiment of the invention.

Referring now to FIG. 14, which illustrates another embodiment of the invention, there will be seen a bird feeder, generally indicated 210, having a top 212, a base 214, and a plurality of vertical supports 216a–216d. The base 214 may be substantially planar or, as shown in FIG. 1, it may be framed by frame members that have a greater height than, and extend up from, the base to frame the remaining portion of the base. A plurality of upper and lower side members 218 and 220, respectively, are mounted between adjacent vertical supports to form the sides of the bird feeder 210. The upper and lower members 218 and 220 are preferably composed of a transparent material, such as Plexiglas, and the top 212 in this embodiment is composed of wood, although, in other preferred embodiments, it may be made of a transparent material. The upper and lower side members 218 and 220 are spaced from each other to provide an ingress/egress opening 222. In this embodiment, each side of the bird feeder has an ingress/egress opening 222.

The ingress/egress openings 222 extend substantially the entire length of the bird feeder, indicated by directional arrow L, between adjacent vertical supports. The ingress/egress openings give birds easy access to and egress from the bird feeder. Birds of a selected size, such as bluebirds, may enter and exit an interior portion of the bird feeder, while birds larger than the selected size, such as mockingbirds and grackles, are prevented from entering the interior portion of the bird feeder. FIG. 14 shows a bluebird feeding in the interior portion of the bird feeder.

Figure 15:
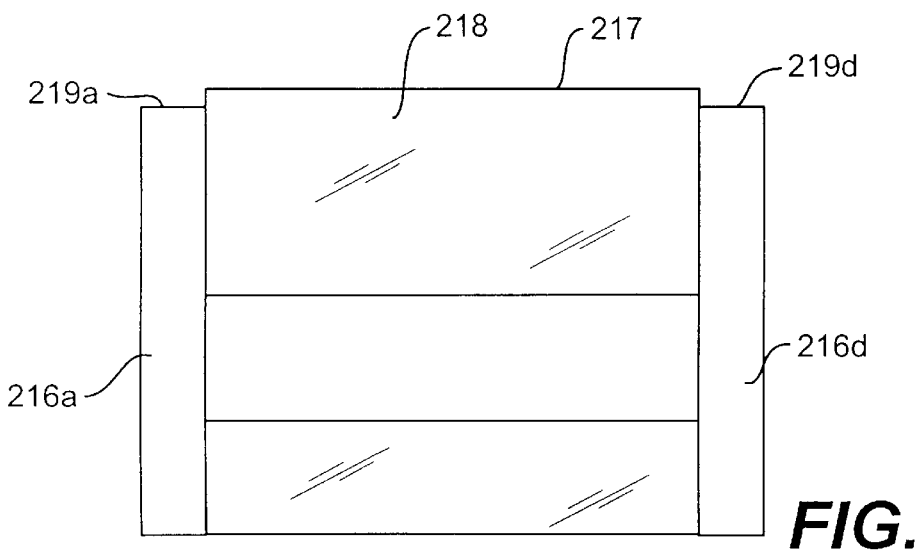
FIG. 15 is an enlarged front view of an upper side member and a lower side member positioned between two vertical supports in accordance with the embodiment of FIG. 14.

As seen in FIG. 14, the relative shape and positioning of the upper and lower side members 218 and 220 determine the size of the ingress/egress openings 222. The upper side members 218 preferably have a height dimension such that, when the top 212 of the bird feeder is closed, at least a portion of the top edge of the upper side members 218 abuts at least a portion of the lower surface of the top 212. Thus, larger birds cannot push up on the upper side members 218 to widen the ingress/egress openings 222 and, as stated above, those larger birds cannot gain access to the interior portion of the bird feeder. When the top 212 is closed, the upper and lower side members 218 and 220 are fixed in place. As shown in FIG. 15, the upper side member 218 may have a height dimension such that, when positioned in place between adjacent vertical supports 216a and 216b, the top edge 217 of the upper side member 218 extends beyond the tops 219a and 219b of the vertical supports 216a and 216b in order to contact the lower surface of top 212. In such a case, the upper side members 218 would support the top 212.

In this embodiment, at least the upper side members 218 are removable from the vertical supports 216a–216d. The vertical supports 216a–216d include grooves 224 for sliding receipt of the upper side members 218. The grooves in the vertical supports preferably extend along the entire length of the vertical support. The bird feeder has spacers 228 that fit within the grooves in the vertical supports. The spacers fit between the upper side member 218 and the lower side member 220 to keep them separate from each other. The length of the spacer, in conjunction with the height of the upper side members 218, determines the height of the ingress/egress opening.

The top 212 of the bird feeder may be opened by detaching a fastener 230 that affixes the top 212 to the vertical supports 216a–216d. When the top 212 is removed from the feeder, the upper side members 218 (and, in certain embodiments, the lower members 220) may be slid up and out from between the vertical supports 216a–216d. In this manner, the bird feeder 10 may be converted from an enclosed-type feeder to a fly-thru feeder by removal of the upper side members 218.

The flexibility of this bird feeder design allows the bird watcher to modify the bird feeder for different uses. Bird watchers can easily remove the upper Plexiglas side members 218 to permit a wider variety of birds to use the feeder. Both large birds and small birds that are skittish about enclosed feeders may use this "fly-thru"-type bird feeder. The convertibility of the bird feeder enhances its value. For example, some bird watchers may never have relatively small bluebirds in their yard or only have bluebirds at certain times of the year; others may wish to provide special food for birds only during the nesting season.

Figure 19:
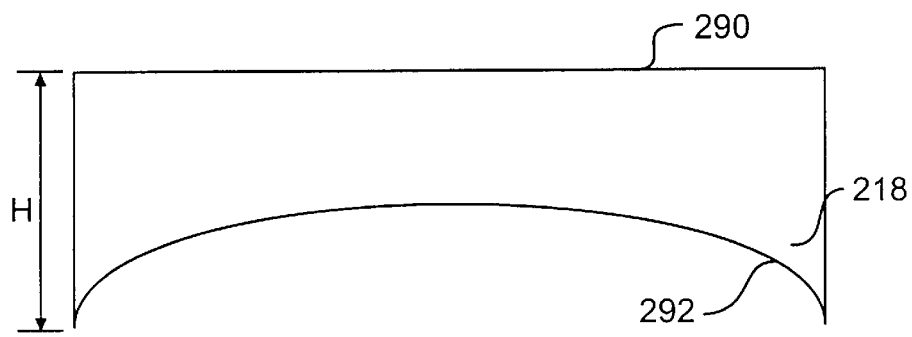
FIG. 19 is an enlarged front view of an upper side member having a curved lower edge in accordance with an embodiment of the invention.

Also, the upper side members 218 may be replaced by side members dimensioned to change the width of the ingress/egress openings so that different sized birds can have access to the food in the interior portion of the bird feeder. The ingress/egress openings 222 shown in FIG. 14 are rectangular in shape. It will be understood that the side members 218 and 220 may be cut to form a differently shaped ingress/egress opening. For example, the top edge of the lower side member and the bottom edge of the upper side member may be cut so that the ingress/egress opening is oval in shape. An example is shown in FIG. 19, which illustrates an upper member 218 having a straight top edge 290 and a curved lower edge 292.

The bird feeder 210 further includes a feed cup, generally indicated 236. The feed cup 236 is located within the interior portion of the bird feeder and is spaced inward from all of the side members. The feed cup must be spaced a sufficient distance away from the side members so that larger birds, such as grackles, with long beaks and long necks cannot contort their head and neck through the ingress/egress opening and reach the food of the feed cup. The size of the feed cup is controlled relative to the size of the feeder so that it remains a sufficient distance away from the ingress/egress openings. The feed cup is preferably less than 6 inches in diameter, and more preferably less than 5 inches in diameter.

Use of a circular feed cup 236 is particularly suitable for holding mealworms. The round shape of the feed cup 236 prevents the mealworms from escaping. If the feed cup has corners, the mealworms pile up in the corners, forming a ramp over which some can escape over the side of the cup. In another embodiment, the feed cup or a food brick may be suspended from the top 212 of the bird feeder so that it hangs in the center of the bird feeder.

Again, the flexibility of the bird feeder design allows the bird watcher to modify the feeder to the bird watcher's particular use. A variety of foods may be presented in the bird feeder. Food can either be placed in the centrally-located feed cup or anywhere else within the interior feeding environment. The lower Plexiglas side members 220 keep seed from spilling, and they allow a greater amount of seed to be presented than would be possible in a standard fly-thru feeder. Hence, the feeder need not be refilled as frequently.

In addition, the bird feeder itself may be in the shape of a triangle, a cylinder, or any other shape. When in a cylindrical shape, for example, the bird feeder may include two vertical supports, two curved upper side members, and two curved lower side members. These curved upper and lower side members then are mounted to the two vertical supports and are vertically spaced from each other to create ingress/egress openings therebetween.

In a preferred embodiment, the bird feeder is rectangular in shape, with one pair of opposite sides (such as sides between 216a and 216d and between 216b and 216c) longer than the other pair of opposite sides (such as sides between 216a and 216b and between 216c and 216d). In a hinged embodiment, the roof or top of the bird feeder may be opened via a side hinge, positioned, for example, on the side between 216a and 216d. In another embodiment, the top of the bird feeder may be lifted completely off of the top edges of the upper side members. The rectangular shape improves the stability of the bird feeder when the roof is opened via the hinge in the hinged embodiment.

Figure 16:
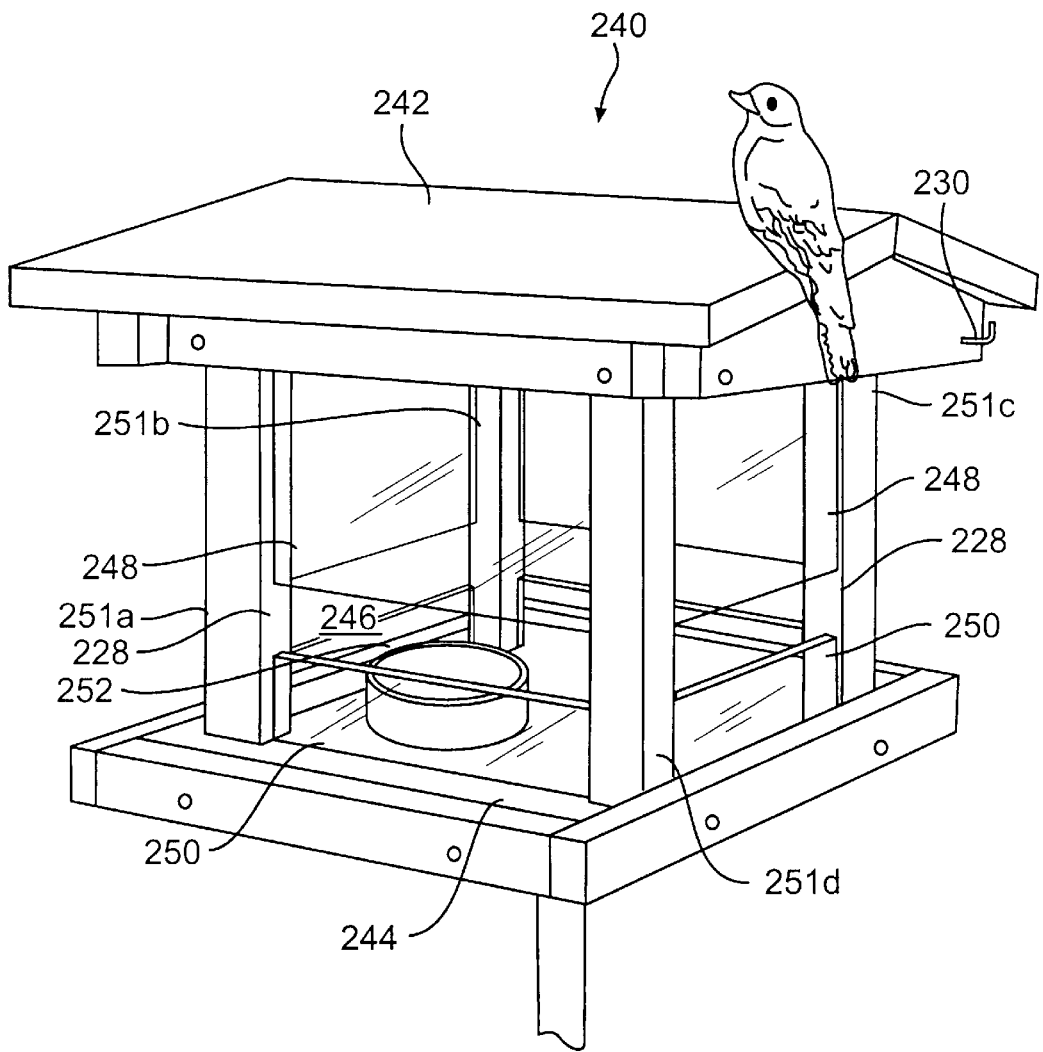
FIG. 16 is a perspective view of a weather-resistant bird feeder in accordance with the invention.

FIG. 16 shows a weather-resistant bird feeder. Like bird feeder 210, bird feeder 240 includes a top 242, a base 244, and side walls. In this embodiment, the bird feeder 240 has one solid side 246 and three Plexiglas sides, each of the three having transparent upper members 248 and lower members 250. A feed cup 252, or seed hopper, is positioned against or mounted to the solid side 246, yet it remains spaced from the ingress/egress openings formed by the upper and lower side members 248 and 250, respectively, of the remaining walls. Because the feed cup rests against a solid wall, it may be protected from wind and rain. By positioning the feeder so that the solid wall blocks prevailing wind and rain, the food and feeding environment are safely maintained.

The weather-resistant bird feeder may afford a more compact design. The solid wall of this embodiment is easy to construct and, in a rectangular bird feeder, can accommodate a larger feeding cup that holds more food. In one embodiment, the solid wall 248, extending between 251a–251b, is longer than the walls extending between 251a–251d and 251b–251c. The larger feeding cup is spaced far enough away from the ingress/egress openings on the shorter sides of the bird feeder so that only certain sized birds have access to the food. Due to the shorter side walls, the dimension of the overall bird feeder may be compact relative to the size of the feed cup.

Figure 17:
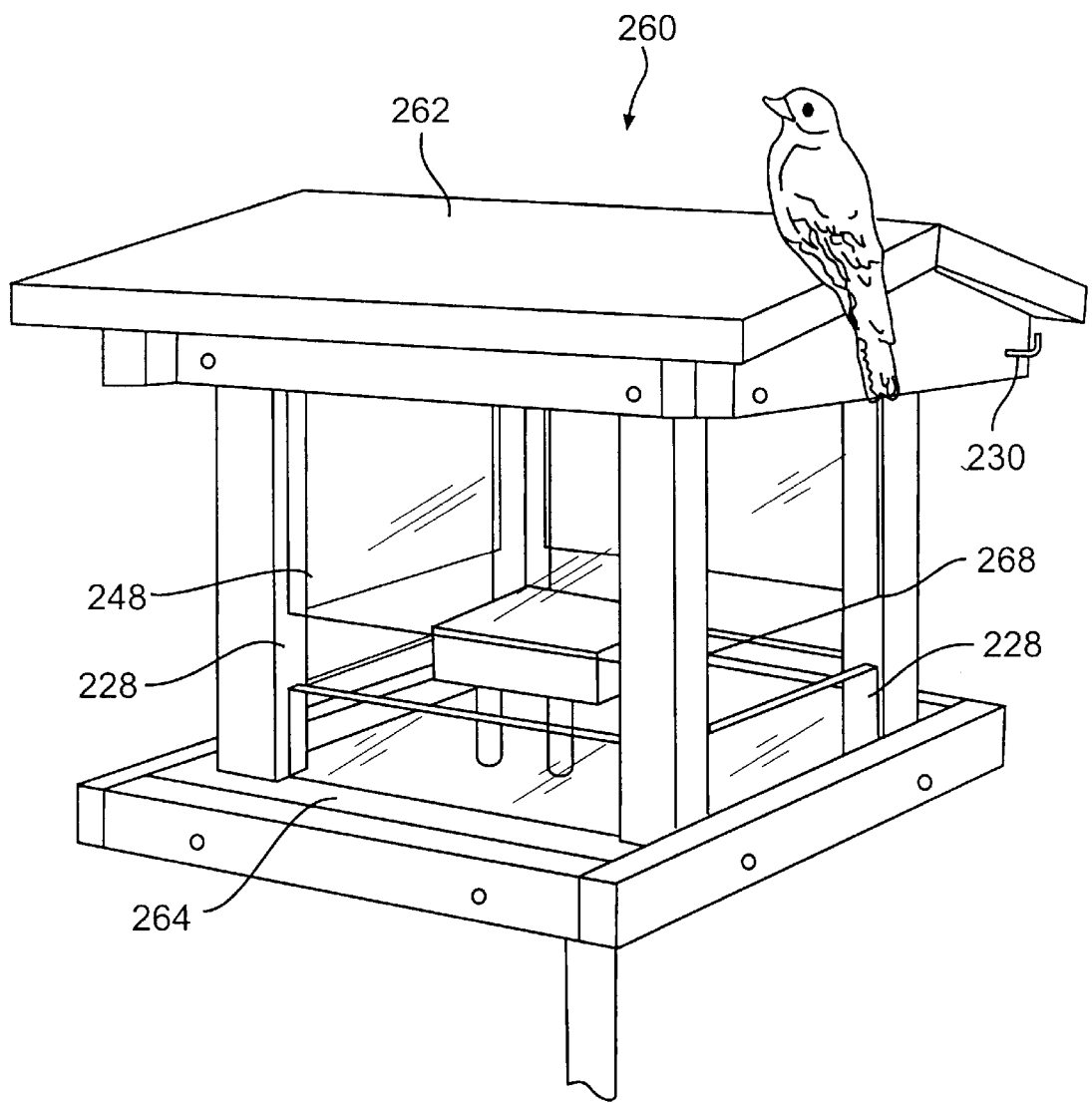
FIG. 17 is a perspective view of a bird feeder in accordance with still another preferred embodiment of the invention.

Yet another embodiment is shown in FIG. 17. The bird feeder 260 includes a top 262, a base 264, and four sides. The bird feeder 260 includes a mounting platform 266 connected to an upper surface of the base 264. A suet cake or other food may be located on the mounting platform 266. Like the feed cup in the first embodiment, the food is positioned a sufficient distance away from the ingress/egress openings in the bird feeder so that only desired species of birds can access it.

The present invention also provides a method of controlling the ingress and egress of birds into and from an interior of the bird feeder. This method includes forming a bird feeder with a base, a top, and a plurality of side members; constructing at least some of the side members in the form of upper and lower side members with an ingress/egress opening therebetween; and manually selectively adjusting a size of the ingress/egress opening between the upper and lower side members small enough to restrict entry into the interior of the bird feeder to selected species of birds. The size of the ingress/egress opening may be adjusted by repositioning of selected ones of the side members. In addition, the enclosed bird feeder may be converted to a fly-thru feeder by removing the upper side members. In another embodiment, the opening on select sides of the feeder may be eliminated entirely.

The method may further comprise providing spacers for placement between (i) the top and the upper side members of the bird feeder and (ii) the upper side members and the lower side members to adjust the size of the ingress/egress opening. Further, the method may include forming the side members of a transparent material or a transparent, tinted material. In addition, vertical supports may be provided between the base and the top, channels may be formed in the vertical supports, and the side members then may be positioned in the channels of the vertical supports. The method also may comprise placing a feed cup within the interior of the bird feeder a sufficient distance from at least some of the side members.

The bird feeder may be fabricated out of plastic or a combination of plastic and metal. When made with strong materials, such as metal, squirrels cannot gnaw through, or otherwise destroy, the sides of the feeder so that the feeder functions as a squirrel-proof or squirrel-resistant feeder. The side members, for example, may be made of steel mesh or may include a metal rim 268 at the edge of Plexiglas side members forming the ingress/egress opening that squirrels cannot easily deform.

Figure 18:
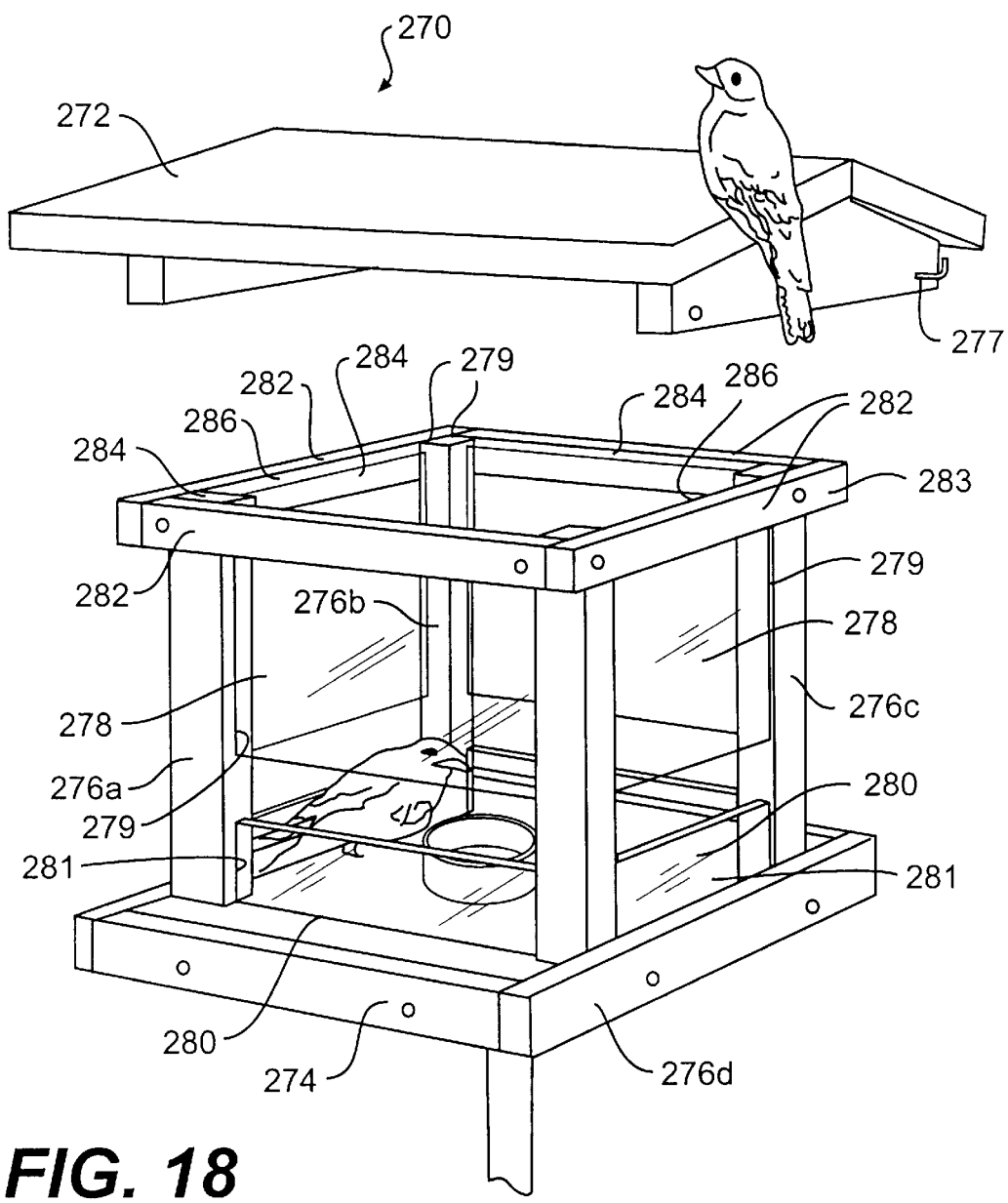
FIG. 18 is an exploded view of another bird feeder in accordance with the invention.

FIG. 18 shows an exploded view of another bird feeder in accordance with the invention. In this figure, the bird feeder 270 includes a top 272, a base 274, and a plurality of vertical supports 276a–276d. The base 274 is substantially planar, preferably having a flat top surface 275 with no outer frame members. A plurality of upper and lower side members 278 and 280, respectively, are mounted between adjacent vertical supports 276a–276d to form the sides of the bird feeder 270. The upper and lower side members 278 and 280 are mounted in upper and lower grooves 279 and 281, respectively. The upper grooves 279 extend to the top of the vertical supports 276a–276d. The bird feeder 270 also has upper frame members 282 (one of which is shown, and labeled 215, in FIG. 14) that are mounted to the vertical supports 276a–276d, outside of the upper side members 278.

As mentioned previously, the top 272 may be hinged to one side of the bird feeder, for example by a screw assembly. FIG. 18 shows a screw 277 which may hingedly attach to the corner portion of a frame member 282 at point 283. Where the top 272 is designed to hinge along the side defined by vertical supports 276b and 276c, a similar screw assembly may be located at the corner of the bird feeder adjacent vertical support 276b (screw assembly not visible). Other hinge mechanisms may also be used to secure the top 272 to the appropriate location on the frame members, such as a dowel, a pin, or a suitably shaped guide member. In a non-hinged embodiment, the top 272 may be opened by lifting it completely off of the top of the vertical supports 276a–276d.

To fix the upper side members 278 in place in the bird feeder of FIG. 18, screws 284 or other suitable securing members may be positioned adjacent the top edge 286 of the upper side members 278 and attached to an inner surface of the respective upper frame members 282. The screw holds the upper side members 282 in place so that birds larger than a selected size cannot push the upper side members to enlarge the ingress/egress opening. To remove the upper side members 278, the screws 284 may be loosened and removed from the upper frame members 282, and the upper side members 278 may be slid out of the grooves 279. In this manner, the species-discriminating bird feeder of FIG. 18 may be converted to a fly-thru feeder. This screw securement mechanism 284 is not necessary in the previously described embodiments where the upper side members are dimensioned so that they abut the lower surface of the top of the bird feeder. The screws 284 of this embodiment may be replaced by the push pins 300 of FIG. 10A or by the spacers 28 of FIGS. 9 and 10 positioned at appropriate locations in the upper grooves 279 to prevent movement of the upper side members 278 by birds or small mammals.

U.S. Provisional Application No. 60/122,102, filed Feb. 26, 1999, and U.S. Provisional Application No. 60/131,928, filed Apr. 30, 1999, are both hereby incorporated by reference in their entireties.

Additional advantages and modifications will readily occur to those skilled in the art. Therefore, the invention in its broader aspects is not limited to the specific details, construction materials, and representative devices, shown and described herein. Accordingly, various modifications may be made without departing from the spirit or scope of the general inventive concept as defined by the appended claims.

We claim:

1. A bird feeder, comprising:
    a base;
    a top; and
    a plurality of sides extending between said base and said top, at least two of said sides having an upper side member and a lower side member, said upper side member and said lower side member being at least partially spaced from each other to provide an ingress/egress opening therebetween so that birds of a selected size may enter and exit an interior portion of the bird feeder through said sides, while birds or mammals larger than the selected size are prevented from entering said interior portion, one of said upper and lower side members being manually selectively adjustable so that a size of the respective ingress/egress opening between said upper side member and said lower side member may be adjusted.

2. A bird feeder as defined in claim 1, wherein each said upper side member is manually selectively adjustable so that a size of the respective ingress/egress opening between said upper side member and said lower side member may be adjusted.

3. A bird feeder as defined in claim 1, further comprising at least two vertical supports extending between said base and said top, one said upper side member and one said lower side member being mounted to adjacent ones of said vertical supports.

4. A bird feeder as defined in claim 3, wherein said plurality of sides comprises a solid back wall, a first side extending between said solid back wall and a first of said vertical supports, a second side extending between said solid back wall and a second of said vertical supports, and a third side extending between said first and said second of said vertical supports, wherein said first, second, and third sides each comprise one upper side member and one lower side member.

5. A bird feeder as defined in claim 3, wherein said vertical supports comprises four vertical supports, and said sides comprise four upper side members and four lower side members.

6. A bird feeder as defined in claim 3, wherein each of said vertical supports includes two grooves extending along a length of said vertical supports, said grooves being configured for receipt of a side edge of said upper and lower side members.

7. A bird feeder as defined in claim 6, wherein each said upper side member and each said lower side member is slidably removable from said vertical supports.

8. A bird feeder as defined in claim 6, wherein the bird feeder further comprises a plurality of removable spacers fittable within respective ones of said grooves, one spacer per groove, to adjust spacing between said upper and lower side members.

9. A bird feeder as defined in claim 8, wherein said spacer is positioned in a respective one of said grooves at a location between a top edge of said respective upper side member and the top of the bird feeder.

10. A bird feeder as defined in claim 8, wherein said spacer is positioned in a respective one of said grooves at a location between a bottom edge of said upper side member and a top edge of said lower side member.

11. A bird feeder as defined in claim 8, wherein a distance from a top surface of said base of the bird feeder to a bottom surface of said top of the bird feeder substantially equals a combined height of a side edge of said upper side member, a side edge of said lower side member, and said spacer.

12. A bird feeder as defined in claim 1, wherein each of said sides includes an upper side member and a lower side member.

13. A bird feeder as defined in claim 1, wherein at least a third one of said sides is solid, and the bird feeder further comprises a feed cup positioned against said third side, spaced away from each ingress/egress opening.

14. A bird feeder as defined in claim 1, wherein at least a third one of said sides comprises a solid wall and includes at least one mounting member attached to an inner surface thereof for releasably mounting a feeding arrangement to said solid wall.

15. A bird feeder as defined in claim 14, wherein said feeding arrangement comprises a backing and at least one of a feed cup, a suet basket, and a mesh cage mounted to said backing.

16. A bird feeder as defined in claim 15, wherein said at least one mounting member includes a pair of rotatable clips permanently affixed to said back wall, said rotatable clips configured to engage said backing of said feeding arrangement and being manually rotatable between a locking position and a release position.

17. A bird feeder as defined in claim 15, wherein said feeding arrangement comprises a backing, a mesh cage, and a deflector mounted on said backing, said deflector extending from said backing downwardly toward a front of said mesh cage, yet remaining spaced from said front.

18. A bird feeder as defined in claim 1, wherein each of said upper and lower side members comprises a transparent material.

19. A bird feeder as defined in claim 18, wherein said transparent side members are tinted.

20. A bird feeder as defined in claim 1, further comprising a feed cup located within said interior portion of the bird feeder, spaced away from each ingress/egress opening.

21. A bird feeder as defined in claim 1, further comprising a suspension member connected to a bottom surface of said top of the bird feeder for suspending food, spaced away from each ingress/egress opening, in said interior portion of the bird feeder.

22. A bird feeder as defined in claim 1, further comprising a mounting platform connected to a top surface of said base of the bird feeder for mounting food, spaced away from each ingress/egress opening, in said interior portion of the bird feeder.

23. A bird feeder as defined in claim 1, wherein said top is completely removable from a top edge of each said upper side member.

24. A bird feeder as defined in claim 1, wherein said upper side member includes a bottom edge having a concave edge surface, and said lower side member includes a top edge having a concave edge surface, said concave edge surfaces defining the ingress/egress opening.

25. A bird feeder as defined in claim 1, wherein said upper side member includes a bottom edge having a first concave surface and a top edge having a second concave surface, and said lower side member includes a third concave edge surface, said ingress/egress opening being defined by said third concave edge surface and at least one of said first and second concave edge surfaces.

26. A bird feeder as defined in claim 1, further comprising a removable floor screen configured to rest on a top surface of said base.

27. A bird feeder as defined in claim 26, wherein said removable floor screen is formed of an expandable steel mesh material.

28. A bird feeder, comprising:
a base;
a top; and
a plurality of sides extending between said base and said top, at least two of said plurality of sides having an upper side member and a lower side member, said upper side member and said lower side member being at least partially spaced from each other to provide an ingress/egress opening therebetween so that birds of a selected size may enter and exit an interior portion of the bird feeder through said two sides, while birds or mammals larger than the selected size are prevented from entering said interior portion of the bird feeder, at least one of said upper and lower side members having a concave edge surface that opens into the respective ingress/egress opening.

29. A bird feeder as defined in claim 28, wherein said upper side member includes a top edge, side edges, and a bottom edge formed with said concave edge surface, said concave edge surface terminating in abutting surfaces at both sides of said concave edge surface, said abutting surfaces being configured to abut said lower side member and, when present, a spacer positioned between said upper and lower side members.

30. A bird feeder as defined in claim 29, wherein said lower side member includes a top edge formed with said concave edge surface, side edges, and a bottom edge, said concave edge surface terminating in abutting surfaces at both sides of said central concave edge surface, said abutting surfaces of said lower side member being configured to abut said abutting surfaces of said upper side member and, when present, a spacer positioned between said upper and lower side members.

31. A bird feeder as defined in claim 30, wherein the ingress/egress opening is substantially oval in shape.

32. A bird feeder, comprising:
a base;
a top; and
a plurality of sides extending between said base and said top, at least two of said sides having an upper side member and a lower side member, said upper side member and said lower side member being at least partially spaced from each other to provide an ingress/egress opening therebetween so that birds of a selected size may enter and exit an interior portion of the bird feeder through said at least two sides, while birds or mammals larger than the selected size are prevented from entering said interior portion of the bird feeder, each said upper side member being manually selectively replaceable with a different upper side member dimensioned to change a width of the respective ingress/egress opening between said upper side member and said lower side member so that birds different from the selected size may have access to said interior portion of the bird feeder.

33. A bird feeder as defined in claim 32, wherein said lower side member has a top edge cut in a generally concave shape, and said upper side member has a bottom edge cut in a generally concave shape.

34. A bird feeder as defined in claim 33, wherein said upper member has a top edge cut in a generally concave shape.

35. A species-discriminating bird feeder, comprising:
    a base;
    a removable top;
    a plurality of vertical supports extending between said base and said top; and
    sides extending between said base and said top and mounted to said vertical supports, said sides each including an upper side member and a lower side member which are at least partially spaced from each other to provide an ingress/egress opening therebetween so that birds of a selected size may enter and exit an interior portion of the bird feeder from any of said sides of the bird feeder, while birds larger than the selected size are prevented from entering said interior portion of the bird feeder, each said upper side member being manually selectively adjustable so that a size of the respective ingress/egress opening between said upper and lower side members is increased or decreased.

36. A bird feeder as defined in claim 35, wherein the bird feeder includes four vertical supports, four upper side members, and four lower side members to form a rectangular bird feeder.

37. A method of controlling ingress and egress of birds into and from an interior of a bird feeder, comprising:
    forming a bird feeder with a base, a top, and a plurality of side members;
    constructing at least some of the side members in the form of upper side members and lower side members with an ingress/egress opening therebetween; and
    manually selectively adjusting a size of the ingress/egress opening between said upper side member and said lower side member small enough to restrict entry into the interior of the bird feeder to selected sizes of birds or mammals.

38. The method as defined in claim 37, further comprising adjusting the size of the ingress/egress opening by repositioning at least one of selected ones of the upper and lower side members.

39. The method as defined in claim 37, further comprising providing spacers for placement between at least one of (i) the top and the upper side members of the bird feeder and (ii) the upper side members and the lower side members to adjust the size of the ingress/egress opening.

40. The method as defined in claim 37, further comprising providing vertical supports between the base and the top, forming grooves in the vertical supports, and positioning the upper side members and the lower side members in the grooves of the vertical supports.

* * * * *